United States Patent [19]

Mukaiya et al.

[11] Patent Number: 5,050,972

[45] Date of Patent: Sep. 24, 1991

[54] ZOOM LENS

[75] Inventors: Hitoshi Mukaiya, Saitama; Nobuyoshi Suzuki; Hiroyuki Hamano, both of Kanagawa; Muneharu Sugiura, Tokyo; Akihisa Horiuchi, Kanagawa, all of Japan

[73] Assignee: Canon Kabushiki Kaisha, Tokyo, Japan

[21] Appl. No.: 475,749

[22] Filed: Feb. 6, 1990

[30] Foreign Application Priority Data

Feb. 8, 1989 [JP] Japan ................................ 1-28963
Feb. 8, 1989 [JP] Japan ................................ 1-28964
Feb. 8, 1989 [JP] Japan ................................ 1-28965

[51] Int. Cl.$^5$ ............................................ G02B 15/00
[52] U.S. Cl. .................................. 359/683; 359/676; 359/708
[58] Field of Search .................... 350/423, 427, 432

[56] References Cited

U.S. PATENT DOCUMENTS

| | | | |
|---|---|---|---|
| 4,763,998 | 8/1988 | Tsuji et al. | 350/427 |
| 4,770,510 | 9/1988 | Mukaiya | 350/427 |
| 4,802,747 | 2/1989 | Horiuchi | 350/427 |
| 4,812,024 | 3/1989 | Mukaiya | 350/427 |
| 4,832,471 | 5/1989 | Hamano | 350/423 |
| 4,846,563 | 7/1989 | Mukaiya | 350/427 |
| 4,854,681 | 8/1989 | Kato et al. | 350/427 |
| 4,854,684 | 8/1989 | Horiuchi | 350/427 |
| 4,892,397 | 1/1990 | Horiuchi | 350/425 |
| 4,934,796 | 6/1990 | Sugiura et al. | 350/427 |

FOREIGN PATENT DOCUMENTS 54-17042 2/1979 Japan .
54-23556 2/1979 Japan .

Primary Examiner—Paul M. Dzierzynski
Attorney, Agent, or Firm—Fitzpatrick, Cella, Harper & Scinto

[57] ABSTRACT

A zoom lens comprising, from front to rear, a first group of positive power for focusing, a second group of negative power for varying the image magnification, a third group of negative power for compensating for the image shift, a fourth lens group of positive power in the form of a bi-convex lens whose rear surface is stronger in curvature than the front surface, a stop, and an image forming fifth group, the fifth groug being divided into two parts of which the front part comprises a bi-convex first lens, a negative second lens having a concave front surface and a positive third lens of stronger front curvature and the rear part comprises a negative fourth lens having a concave rear surface, a bi-convex fifth lens and a positive sixth lens of stronger front curvature, and the zoom lens satisfying the following conditions:

$3.9 < f4/fw < 4.5$ $3.8 < f51/fw < 4.2$ $1.05 < R5,2/R5,3 < 1.2$ $1.25 < D51-52/fw < 1.39$ where f4 and f51 are the focal lengths of the fourth group and the front part respectively, fw is the shortest focal length of the entire lens system, R5,i is the radius of curvature of the i-th surface counting from front in the fifth group and D51-52 is the axial air separation between the front and rear parts.

6 Claims, 17 Drawing Sheets

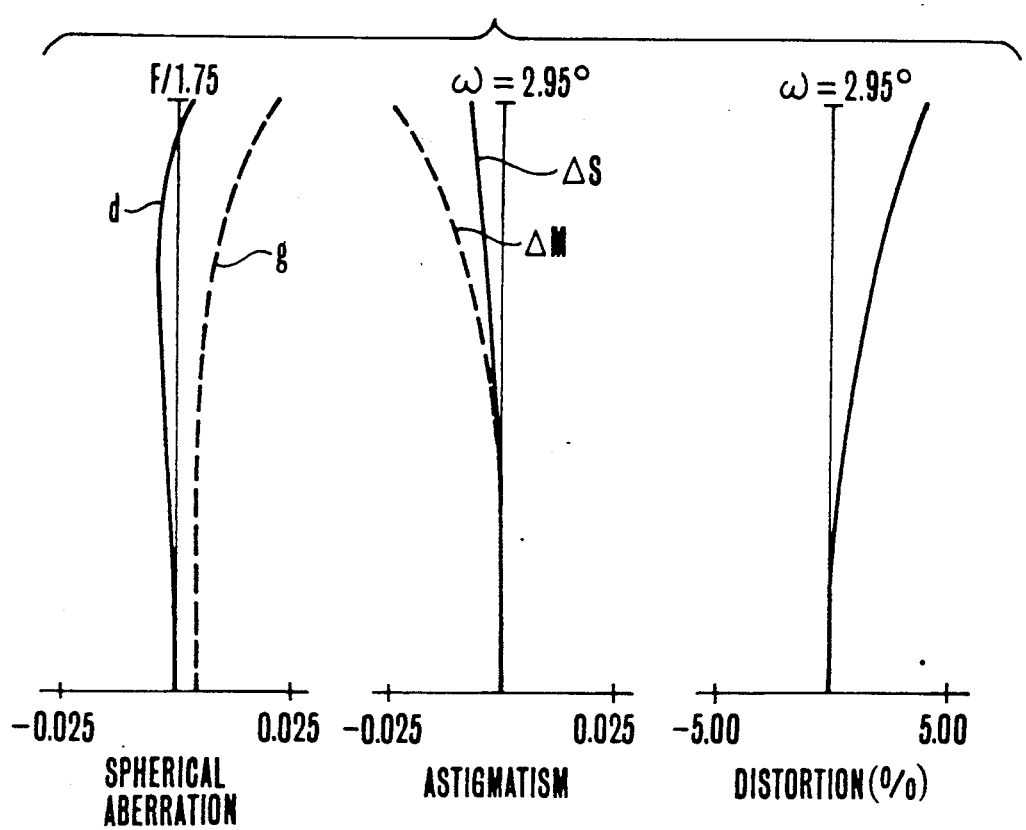

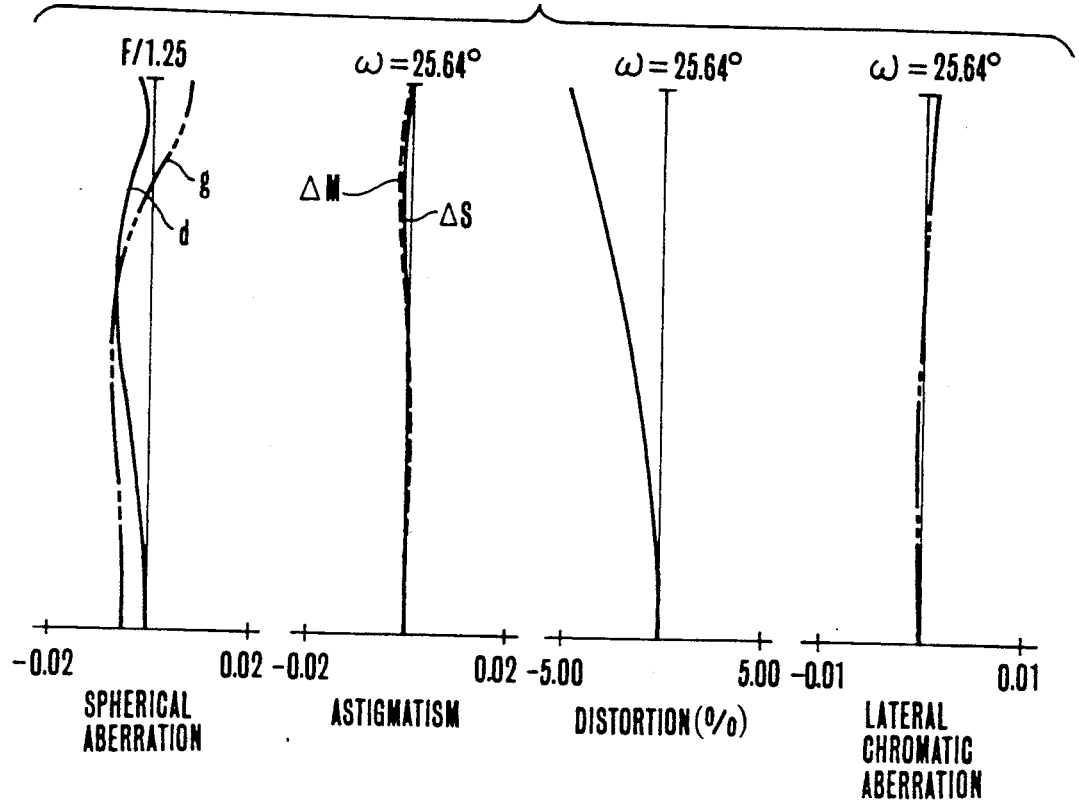
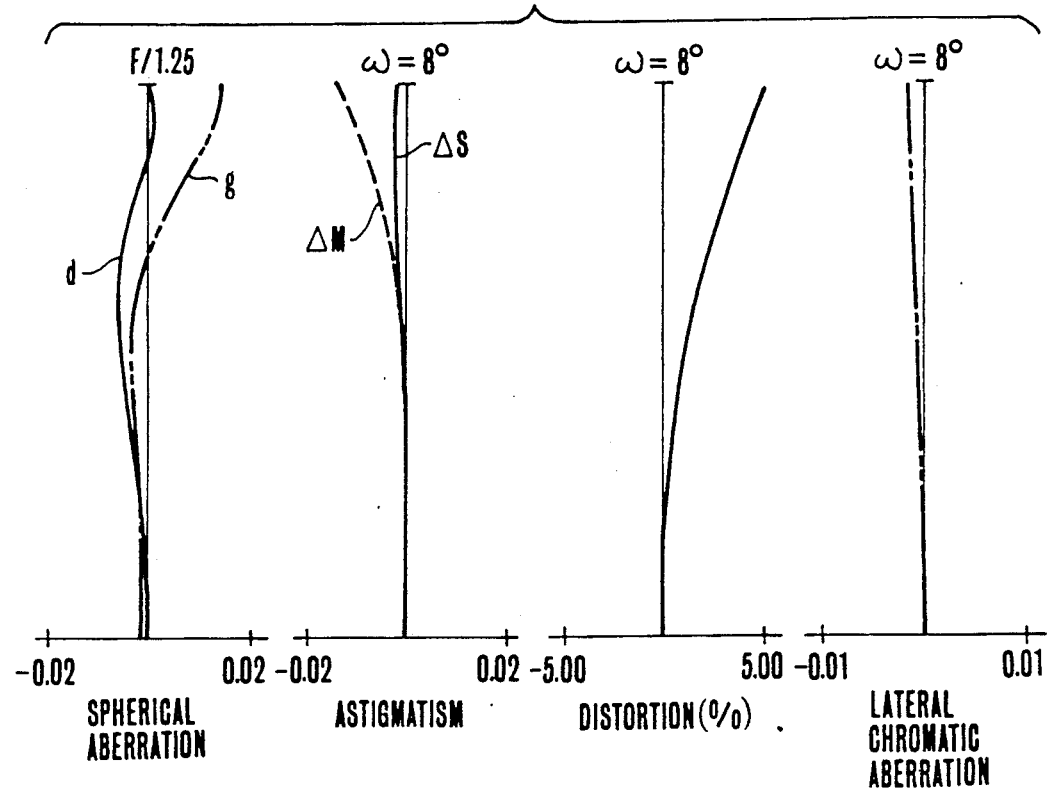

ZOOM LENS

BACKGROUND OF THE INVENTION

1. Field of the Invention

This invention relates to zoom lenses and, more particularly, to such zoom lenses which have an F-number of 1.2 and as high a zoom range as about 10 and are corrected by using an aspheric surface for high optical performance over the entire zooming range suited to photographic cameras, or video cameras.

2. Description of the Related Art

To the cameras for photography or the video cameras, there has been an increasing demand for zoom lenses of large relative aperture and high range while nevertheless maintaining a high contrast to be achieved for high optical performance.

Of these, the zoom lens for the video camera of home use, for example, is required to have as high a resolving power as, for example, 50 lines/mm in the spatial frequency over the entire area of the picture frame, as the number of picture elements in the image sensor such as CCD increases and the recording method improves to S-VHS or the like.

Proposals for a zoom lens of increased magnification range to 10 or thereabout are made in, for example, Japanese Laid-Open Patent Applications Nos. Sho 54-17042 and Sho 54-23556. This zoom lens comprises, from front to rear, a first lens group of positive power for focusing, a second lens group of negative power for variation of the image magnification, a third lens group of negative power for compensation for the image plane shift resulting from the variation of the image magnification, a fourth lens group for making afocal the light beam coming from the third lens group and a fifth lens group for formation of an image. That is, the use of the so-called 5-group type is proposed in these documents.

With the 5-group type zoom lens, when to achieve great increases in the relative aperture and magnification range, while preserving high optical performance, it becomes important in a general case to appropriately set up various appropriate optical factors over all the lens groups constituting the lens system.

If a simple way of, for example, individually strengthening the refractive powers of the lens groups, or increasing the number of lenses in each lens group is used in the attempt to achieve the increases of the aperture ratio and the magnification range, the size of the entire lens system is caused to increase and, at the same time, the spherical aberration in the paraxial zone of the picture frame, the coma in the intermediate to the marginal zone and higher order aberrations such as sagittal halo also significantly increase largely. Further, the range of variation of aberrations with zooming, too, is increased. Thus, a problem of increasing the difficulty of obtaining a high optical performance will arise. As the related arts, there are those disclosed in U.S. Pat. No. 4,812,024 and U.S. patent applications Ser. No. 223,108 filed on July 22, 1988 and Ser. No. 301,951 filed on Jan. 26, 1989.

SUMMARY OF THE INVENTION

An object of the present invention is to provide a zoom lens improvement wherein the so-called 5-group type is employed, with proper rules of design set forth mainly for the fourth and fifth lens groups, when the aperture ratio is increased to F 1.2 or thereabout in the F-number, and the magnification range to 10 in such a way that the optical performance is maintained high over the entire area of the picture frame.

BRIEF DESCRIPTION OF THE DRAWINGS

FIGS. 2(A), 2(B) and 2(C), FIGS. 3(A), 3(B) and 3(C), FIGS. 5(A), 5(B) and 5(C), through FIGS. 7(A), 7(B) and 7(C), and FIGS. 9(A), 9(B) and 9(C) through FIGS. 12(A), 12(B) and 12(C) are graphic representations of the aberrations of numerical examples 1 to 9 of the invention respectively, where the figure numbers suffixed with (A) are in the wide-angle end, those suffixed with (B) in an intermediate position, and those suffixed with (C) in the telephoto end.

In the figures, I, II, III, IV and V represent the first, the second, the third, the fourth and the fifth lens groups; $\Delta M$ represents the meridional image surface, $\Delta S$ the sagittal image surface, d is the d-line, and g the g-line; and SP is the stop.

DETAILED DESCRIPTION OF THE PREFERRED EMBODIMENTS

Figure 1:
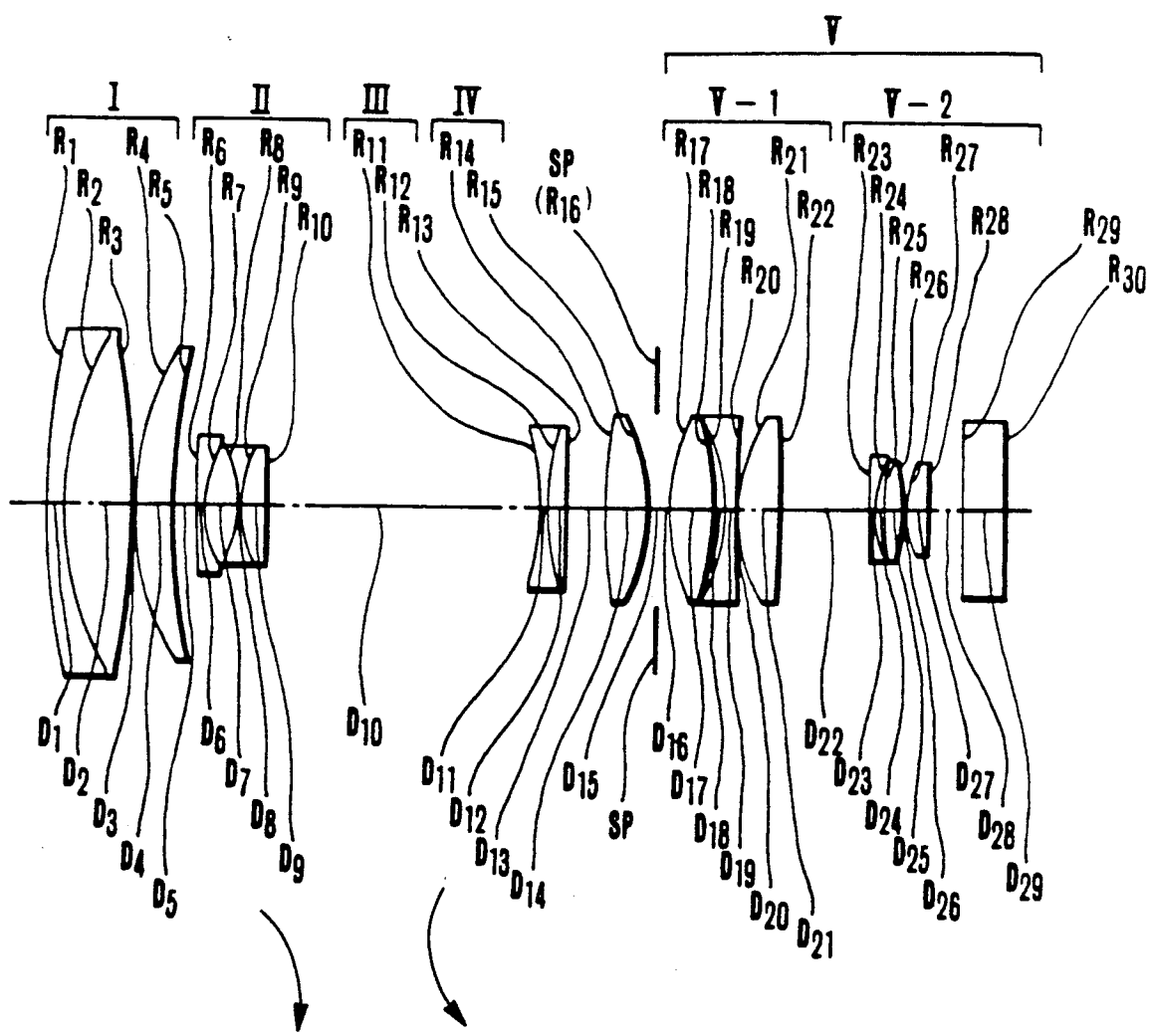
FIG. 1, FIG. 4 and FIG. 8 are longitudinal section views of zoom lenses of the invention in the wide-angle end.
Figure 2A:
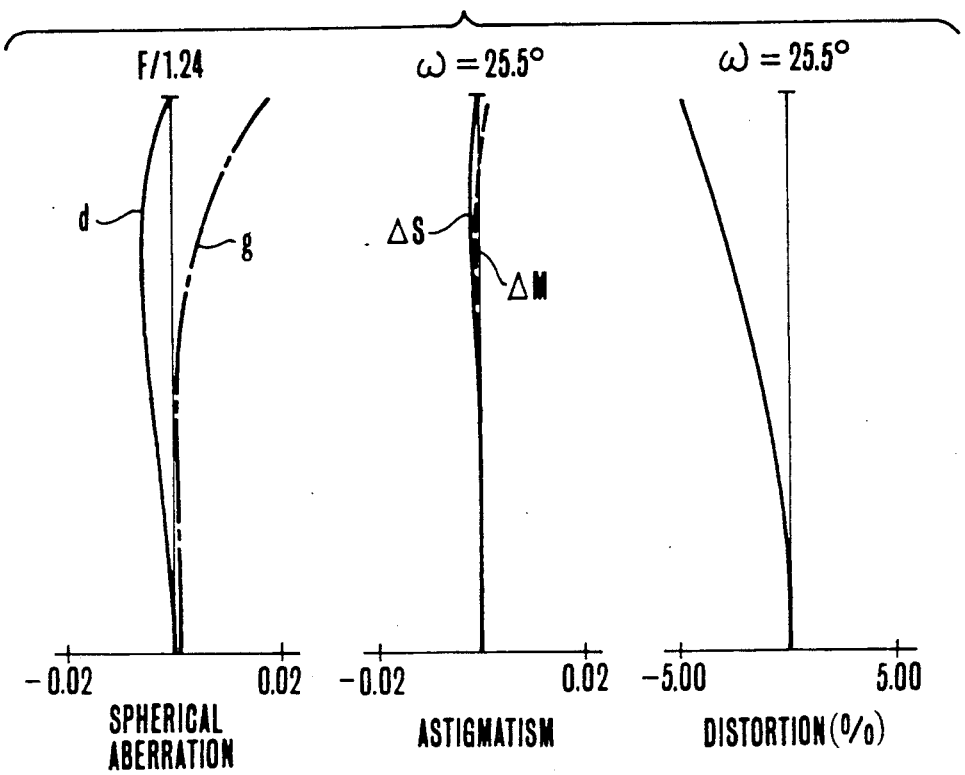
Figure 2B:
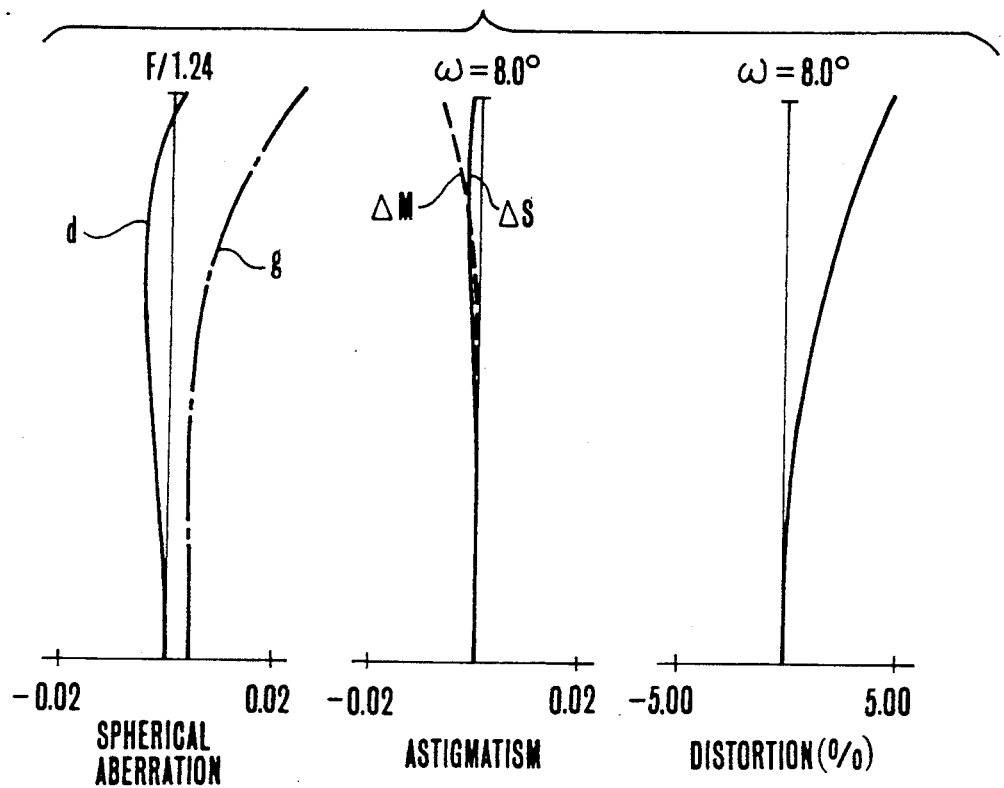
Figure 2C:
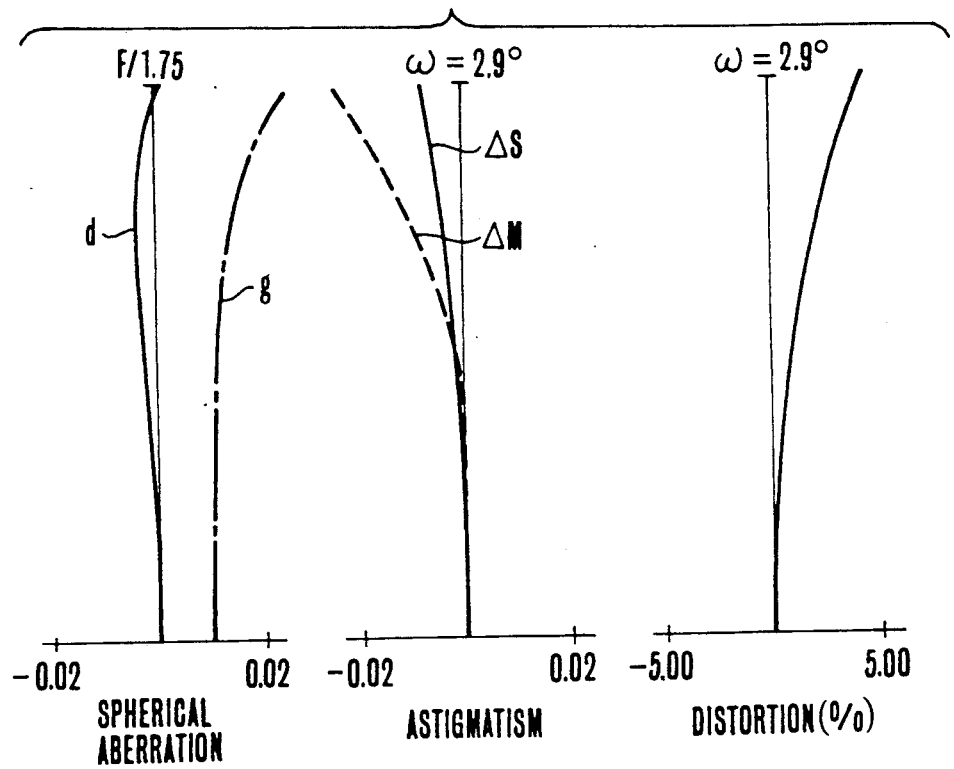
Figure 3A:
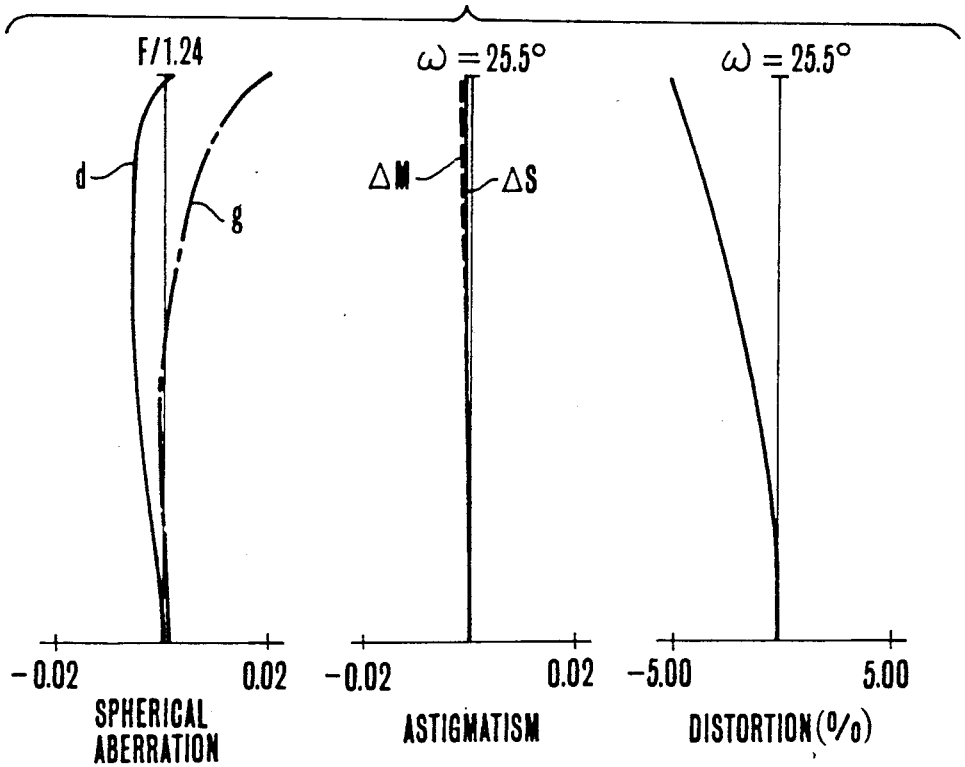
Figure 3B:
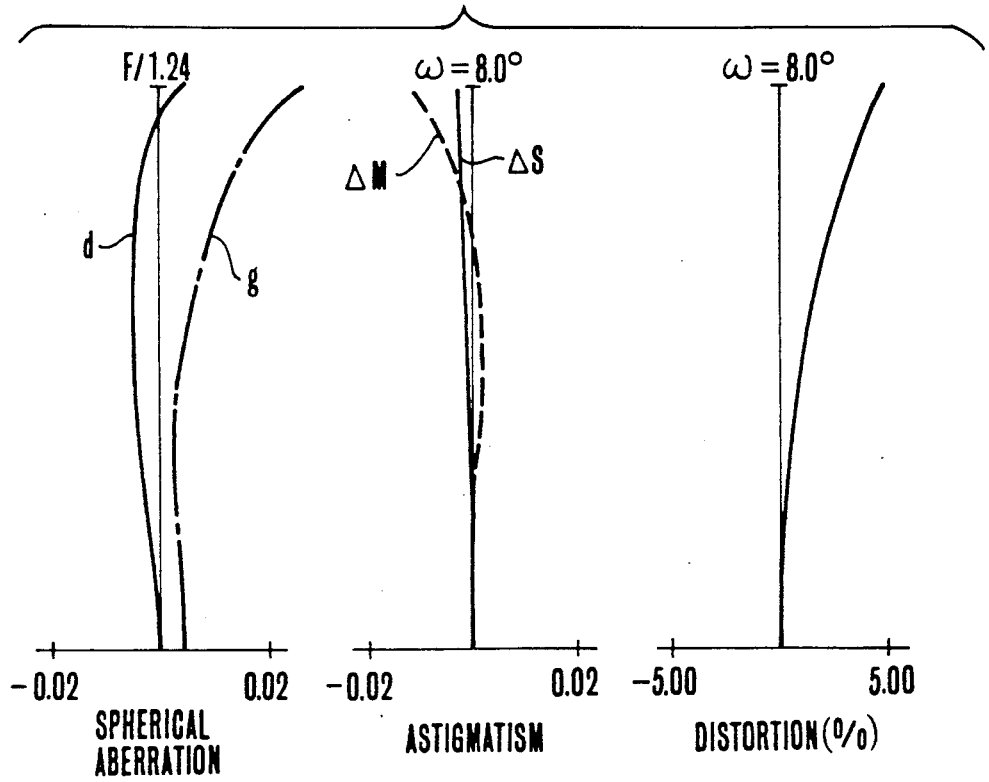
Figure 3C:
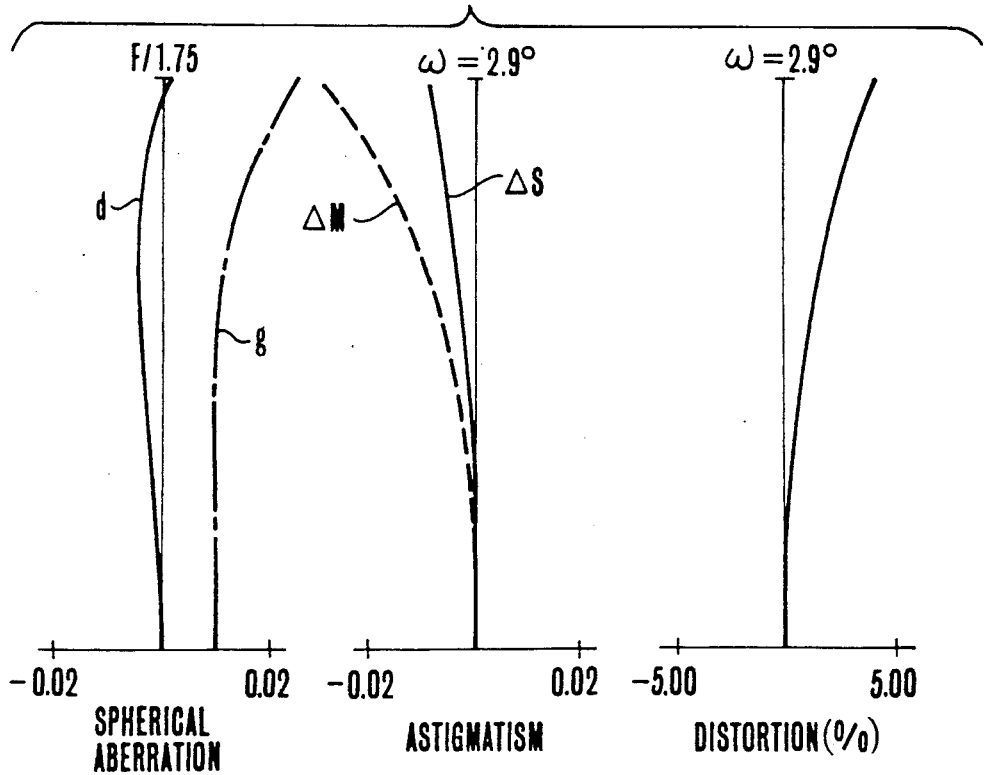

FIG. 1 in block diagram shows a first specific embodiment of a zoom lens according to the invention. The zoom lens comprises a first lens group I of positive power for focusing, a second lens group II of negative power monotonously movable along an optical axis when varying the image magnification, a third lens group III of negative power movable along the optical axis to compensate for the shift of an image plane resulting from the variation of the image magnification, a fourth lens group IV of positive power comprising a single lens element having a strong refracting surface at its image side, and a fixed fifth lens group V having the image forming function and comprised of a front lens sub-group V-1 and a rear lens sub-group V-2. A fixed stop is positioned at SP.

In the present embodiment applied to such a zoom type, the aforesaid front lens sub-group V-1 is constructed from a first lens of bi-convex form, a negative second lens whose front surface is concave toward the front, and a positive third lens whose front surface is of strong curvature, and the aforesaid rear lens sub-group V-2 is constructed from a negative fourth lens whose rear surface is concave toward the rear, a fifth lens of bi-convex form and a positive sixth lens whose front surface is of strong curvature. And the following conditions are set forth:

$$3.9 < f4/fw < 4.5 \tag{1}$$

$$3.8 < f51/fw < 4.2 \tag{2}$$

$$1.05 < R5,2/R5,3 \text{ is approximately } 1.35$$

$$1.25 < D51\text{-}52/fw < 1.39 \tag{4}$$

where f4 is the focal length of the fourth lens group, f51 is the focal length of the front lens sub-group, fw is the shortest focal length of the entire lens system, R5,i is the radius of curvature of the i-th lens surface counting from front in the fifth lens group, and D51-52 is the air separation between the front lens sub-group and the rear lens sub-group.

When these conditions are satisfied, the aberrations attributable to the increases of the aperture ratio and the magnification range can be corrected well over the entire area of the image frame. Thus the high optical performance is obtained.

Particularly with the fourth and fifth lens groups, by specifying the form and construction and arrangement of the constituent lenses as described above, the residual aberrations of the magnification varying system, for example, the spherical aberration and coma, can be corrected in good balance, while achieving a shortening of the total length of the entire lens system.

The technical significance of each of the above-described conditions is explained below.

The inequalities of condition (1) concern with the refractive power of the fourth lens group and have a main aim that the rays of light emerging from the fourth lens group are made divergent and, even if, as the invention is applied to the zoom lens in the video camera or the like, the fifth lens group moves to effect tracking for the sharp focus, little variation of the aberrations results.

When the refractive power of the fourth lens group is too weak as exceeding the upper limit of the inequalities of condition (1), the range of variation of aberrations with tracking for sharp focus by the fifth lens group increases. Hence, the optical performance comes to lower. When the refractive power of the fourth lens group is too strong as exceeding the lower limit of the inequalities of condition (1), the emerging light, beam from the fourth lens group becomes an afocal or convergent state. In the condition of the convergent light beam, the variation of aberration with tracking movement gets larger. If the light beam from the fourth lens is afocal, ghost or flare will be produced, since, as the CCD or MOS is widely used as the image sensor, the surface of its cover glass and the surface of the image sensor have generally a high reflectance, and, because of this, the light reflected from these surfaces reflects from the lens surfaces of the photographic lens and the lens barrel, entering again the image sensor. So this should be avoided.

The inequalities of condition (2) concern with the refractive power of the front lens sub-group and have an aim to correct aberrations in good balance while achieving a shortening of the total length of the entire lens system.

When the refractive power of the front lens sub-group is too weak as exceeding the upper limit of the inequalities of condition (2), the physical length of the fifth lens group gets longer. When the refractive power of the front lens sub-group is too strong as exceeding the lower limit, the light beam emerges from the front lens sub-group in too great convergence, causing various aberrations, particularly spherical aberration and inward coma to increase objectionably.

The inequalities of condition (3) give a proper range for the refractive power of an air lens formed by the first lens and the second lens and have an aim to well correct various aberrations.

When the upper limit of the inequalities of condition (3) is exceeded, the longitudinal chromatic aberration becomes difficult to correct well. When the lower limit is exceeded, the coma increases objectionably.

The inequalities of condition (4) give a proper range for the axial air separation that is used to divide the fifth lens group into the front lens sub-group and the rear lens sub-group as it is the widest within the fifth lens group, and have an aim mainly to correct on-axial aberrations and off-axial aberrations in good balance.

When the air separation between the front lens sub-group and the rear lens sub-group increases beyond the upper limit of the inequalities of condition (4), good correction of the on-axial aberrations such as spherical aberration becomes difficult to perform. When the air separation between the front lens sub-group and the rear lens sub-group is too narrow as exceeding the lower limit of the inequalities of condition (4), the off-axial aberrations such as astigmatism and coma become difficult to correct well.

The above-cited various conditions suffice for achieving the zoom lens the invention aims at. Yet, to achieve a further improvement of the optical performance over the entire area of the image frame, it is recommended, to apply aspheric sphere to at least the first surface of the fourth lens group under the condition that the aspheric surface has such a shape that the radius of curvature gets progressively larger from the center toward the margin. By this, it mainly results in that higher order spherical aberrations are advantageously prevented from producing, and the coma at or near the intermediate zone of the image frame is corrected well.

In this connection, it should be explained that, since, in the present embodiment, the fourth lens group is constructed to the positive refractive power, as the axial beam moves away from the center, the spherical aberration gets more under-corrected. Hence, the higher order aberrations become more liable to increase. Particularly because the fourth lens group takes its place in the position where the axial light beam comes to a high height, spherical aberration is liable to produce. So, in the present embodiment, by using an aspheric surface of such a shape as defined before, it is made possible to facilitate the increase of the relative aperture to 1.2 in F-number while still permitting a high contrast to be achieved. Thus, a high performance zoom lens can be realized.

By the way, in the above-described embodiment, the zoom lens having an F-number of 1.2 and a range of about 10 is achieved in such a way that while the fourth lens group is constructed by introducing an aspheric surface, the fifth lens group is constructed with the six lens elements. A zoom lens of as high performance can otherwise be formed by introducing the aspheric surface into the fifth lens group. In this connection, another embodiment is described by reference to FIG. 4.

In the same figure, the first three lens groups I, II and III are fundamentally similar in construction to those of FIG. 1. So, their explanation is omitted here. A fourth lens group IV has its rear refracting surface made strong in curvature, and its refractive power is positive. In this embodiment, no aspheric surface is introduced into this four lens group.

And, a fifth lens group V is stationary during zooming and has the image forming function, comprising a front lens sub-group V-1 and a rear lens sub-group V-2. SP represents a fixed stop.

In the present embodiment applied to such a zoom type, the front lens sub-group is constructed with a first lens of bi-convex form, a second lens of bi-convex form, a third lens of bi-concave form, and a positive four lens whose front surface is of strong curvature, totaling four lens elements, while the rear lens sub-group is constructed with a negative fifth lens whose rear surface is concave toward the rear, a sixth lens of bi-convex form, and a positive seventh lens whose front surface is of strong curvature, totaling three lens elements.

And, with this, the following conditions are set forth:

$$3.9 < f4/fw < 4.5 \quad (5)$$

$$3.8 < f51/fw < 4.4 \quad (6)$$

$$0.7 < |R5,5/R5,3| < 1.3 \quad (7)$$

$$1.05 < D51\text{-}52/fw < 1.35 \quad (8)$$

where f4 is the focal length of the fourth lens group, f51 is the focal length of the front lens sub-group, fw is the shortest focal length of the entire lens system, R5,i is the radius of curvature of the i-th lens surface counting from front in the fifth lens group, and D51-52 is the axial air separation between the front and rear lens sub-groups.

When these conditions are satisfied, the aberrations attributable to the increases of the relative aperture and the magnification range are well corrected for good optical performance over the entire area of the image frame.

Of these inequalities of conditions, the ones (5), (6) and (8) have similar technical significances to those of the before-described inequalities of conditions (1), (2) and (4) respectively. So, their explanation is omitted here. The next explanation is given to the condition (7).

The inequalities of condition (7) concern with the ratio of the radius of curvature of the front surface of the second lens to the radius of curvature of the front surface of the third lens, and have an aim mainly to correct spherical aberration and coma in good balance at or near an F-number of 1.2. When the upper limit of the inequalities of condition (7) is exceeded, the spherical aberration becomes under-corrected and, at the same time, the inward coma is increased largely. Conversely when the lower limit is exceeded, the spherical aberration gets over-corrected objectionably.

Five numerical examples 1 to 5 of specific zoom lenses of the invention can be constructed in accordance with the numerical data given below for the radii of curvature, Ri, the axial lens thicknesses or air separations, Di, and the refractive indices, Ni, and Abbe numbers, $\nu i$, of the glasses of the lens elements with the subscripts numbered consecutively from front to rear.

The shape of an aspheric surface is expressed in the coordinates of an X-axis in the axial direction and an H-axis in the perpendicular direction to the optical axis with the direction in which light taken as positive advances by the following equation:

$$X = (1/R)H^2/(1+(H/R^2)^{\frac{1}{2}}) + AH^2 + BH^4 + CH^6 + DH^8 + EH^{10}$$

where R is the radius of the osculating sphere and A, B, C, D and E are the aspheric coefficients.

The values of the factors in all the above-described conditions (1) to (8) for the numerical examples 1 to 5 are listed in Table-1 and Table-2.

Numerical Example 1

F = 1–9.38   FNo = 1:1.24–1.75   2ω = 51.0°–5.8°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = 9.502 | D14 = 0.727 | N9 = 1.58313 | ν9 = 59.4 |
| R15 = Aspheric | D15 = 0.113 | | |
| R16 = Stop | D16 = 0.227 | | |
| R17 = 3.643 | D17 = 0.750 | N10 = 1.60311 | ν10 = 60.7 |
| R18 = −4.058 | D18 = 0.110 | | |
| R19 = −3.006 | D19 = 0.170 | N11 = 1.80518 | ν11 = 25.4 |
| R20 = 20.014 | D20 = 0.017 | | |
| R21 = 2.603 | D21 = 0.715 | N12 = 1.60311 | ν12 = 60.7 |
| R22 = −29.193 | D22 = 1.322 | | |
| R23 = 35.665 | D23 = 0.102 | N13 = 1.83400 | ν13 = 37.2 |
| R24 = 1.627 | D24 = 0.153 | | |
| R25 = 4.451 | D25 = 0.295 | N14 = 1.60311 | ν14 = 60.7 |
| R26 = −4.349 | D26 = 0.017 | | |
| R27 = 2.026 | D27 = 0.363 | N15 = 1.58267 | ν15 = 46.4 |
| R28 = −42.010 | D28 = 0.568 | | |
| R29 = ∞ | D29 = 0.681 | N16 = 1.51633 | ν16 = 64.1 |
| R30 = ∞ | | | |

Lens Separations During Zooming

| Focal Length | D5 | D10 | D13 |
|---|---|---|---|
| 1 | 0.163 | 4.386 | 0.269 |
| 3.42 | 3.062 | 0.900 | 0.857 |
| 9.38 | 4.300 | 0.389 | 0.130 |

Values of the Aspheric Coefficients:

R = −3.2936
A = 0
B = 2.2778 × 10⁻³
C = −5.5910 × 10⁻⁴
D = 2.6917 × 10⁻⁴
E = −1.4208 × 10⁻⁴

| Distance from the Center of the Area of Lens | R |
|---|---|
| 0 | −3.2936 |
| 0.5 | −3.2937 |
| 1.0 | −3.2953 |
| 1.49 | −3.2971 |

Numerical Example 2

F = 1–9.38   FNo = 1:1.24–1.75   2ω = 51.0°–5.8°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = Aspheric | D14 = 0.727 | N9 = 1.58313 | ν9 = 59.4 |
| R15 = −3.273 | D15 = 0.113 | | |
| R16 = Stop | D16 = 0.227 | | |
| R17 = 3.650 | D17 = 0.750 | N10 = 1.60311 | ν10 = 60.7 |
| R18 = −4.058 | D18 = 0.109 | | |
| R19 = −3.005 | D19 = 0.170 | N11 = 1.80518 | ν11 = 25.4 |
| R20 = 20.057 | D20 = 0.017 | | |
| R21 = 2.601 | D21 = 0.715 | N12 = 1.60311 | ν12 = 60.7 |
| R22 = −28.996 | D22 = 1.325 | | |
| R23 = 35.840 | D23 = 0.102 | N13 = 1.83400 | ν13 = 37.2 |
| R24 = 1.624 | D24 = 0.153 | | |
| R25 = 4.458 | D25 = 0.295 | N14 = 1.60311 | ν14 = 60.7 |
| R26 = −4.320 | D26 = 0.017 | | |
| R27 = 2.030 | D27 = 0.363 | N15 = 1.58267 | ν15 = 46.4 |
| R28 = −39.348 | D28 = 0.568 | | |
| R29 = ∞ | D29 = 0.681 | N16 = 1.51633 | ν16 = 64.1 |
| R30 = ∞ | | | |

-continued

Len Separations During Zooming

| Focal Length | D5 | D10 | D13 |
|---|---|---|---|
| 1 | 0.163 | 4.386 | 0.267 |
| 3.42 | 3.062 | 0.900 | 0.854 |
| 9.38 | 4.300 | 0.389 | 0.128 |

Values of the Aspheric Coefficients

R = 9.6839
A = 0
B = $-2.6727 \times 10^{-3}$
C = $2.3923 \times 10^{-4}$
D = $3.7753 \times 10^{-4}$
E = $-2.6965 \times 10^{-5}$

| Distance from the Center of the Area of Lens | R |
|---|---|
| 0 | 9.6839 |
| 0.5 | 9.6840 |
| 1.0 | 9.6860 |
| 1.44 | 9.6871 |

TABLE 1

| Condition | Numerical Example 1 | Numerical Example 2 |
|---|---|---|
| (1) f4/fw | 4.28 | 4.28 |
| (2) f51/fw | 4.01 | 4.01 |
| (3) R5,2/R5,3 | 1.35 | 1.35 |
| (4) D51-52/fw | 1.323 | 1.325 |

Numerical Example 3

F = 1–9.38   FNo = 1:1.25–1.75   2ω = 51.6°–5.9°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = 7.323 | D14 = 0.636 | N9 = 1.60311 | ν9 = 60.7 |
| R15 = −3.863 | D15 = 0.113 | | |
| R16 = Stop | D16 = 0.227 | | |
| R17 = Aspheric | D17 = 0.477 | N10 = 1.58313 | ν10 = 59.4 |
| R18 = −25.777 | D18 = 0.017 | | |
| R19 = 4.175 | D19 = 0.477 | N11 = 1.60311 | ν11 = 60.7 |
| R20 = −15.198 | D20 = 0.153 | | |
| R21 = −5.001 | D21 = 0.170 | N12 = 1.84666 | ν12 = 23.9 |
| R22 = 5.787 | D22 = 0.017 | | |
| R23 = 2.390 | D23 = 0.670 | N13 = 1.60311 | ν13 = 60.7 |
| R24 = −100.748 | D24 = 1.277 | | |
| R25 = −61.108 | D25 = 0.102 | N14 = 1.83400 | ν14 = 37.2 |
| R26 = 1.784 | D26 = 0.167 | | |
| R27 = 7.132 | D27 = 0.295 | N15 = 1.62299 | ν15 = 58.1 |
| R28 = −3.241 | D28 = 0.017 | | |
| R29 = 2.040 | D29 = 0.386 | N16 = 1.62004 | ν16 = 36.3 |
| R30 = −105.298 | D30 = 0.568 | | |
| R31 = ∞ | D31 = 0.681 | N17 = 1.51633 | ν17 = 64.1 |
| R32 = ∞ | | | |

Lens Separations During Zooming

| Focal Length | D5 | D10 | D13 |
|---|---|---|---|
| 1 | 0.1639 | 4.3865 | 0.3524 |
| 3.42 | 3.0625 | 0.9004 | 0.9399 |
| 9.38 | 4.3001 | 0.3896 | 0.2131 |

Values of the Aspheric Coefficients:

R = 6.5120
A = 0
B = $-3.138 \times 10^{-3}$
C = $2.974 \times 10^{-5}$
D = $1.172 \times 10^{-4}$
E = $1.050 \times 10^{-5}$

Numerical Example 4

F = 1–9.38   FNo = 1:1.25–1.75   2ω = 51.6°–5.9°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = 7.323 | D14 = 0.636 | N9 = 1.60311 | ν9 = 60.7 |
| R15 = −3.863 | D15 = 0.113 | | |
| R16 = Stop | D16 = 0.227 | | |
| R17 = Aspheric | D17 = 0.500 | N10 = 1.58313 | ν10 = 59.4 |
| R18 = −39.343 | D18 = 0.017 | | |
| R19 = 4.087 | D19 = 0.511 | N11 = 1.51633 | ν11 = 64.1 |
| R20 = −9.652 | D20 = 0.128 | | |
| R21 = −4.617 | D21 = 0.170 | N12 = 1.84666 | ν12 = 23.9 |
| R22 = 6.062 | D22 = 0.017 | | |
| R23 = 2.507 | D23 = 0.659 | N13 = 1.63854 | ν13 = 55.4 |
| R24 = −29.850 | D24 = 1.244 | | |
| R25 = −372.879 | D25 = 0.102 | N14 = 1.83400 | ν14 = 37.2 |
| R26 = 1.768 | D26 = 0.169 | | |
| R27 = 8.221 | D27 = 0.306 | N15 = 1.62299 | ν15 = 58.1 |
| R28 = −3.170 | D28 = 0.017 | | |
| R29 = 2.059 | D29 = 0.386 | N16 = 1.62004 | ν16 = 36.3 |
| R30 = 161.262 | D30 = 0.568 | | |
| R31 = ∞ | D31 = 0.681 | N17 = 1.51633 | ν17 = 64.1 |
| R32 = ∞ | | | |

Lens Separations During Zooming

| Focal Length | D5 | D10 | D13 |
|---|---|---|---|
| 1 | 0.1639 | 4.3865 | 0.3524 |
| 3.42 | 3.0625 | 0.9004 | 0.9399 |
| 9.38 | 4.3001 | 0.3896 | 0.2131 |

Values of the Aspheric Coefficients:

R = 5.7186
A = 0
B = $-3.332 \times 10^{-3}$
C = $-3.637 \times 10^{-4}$
D = $7.349 \times 10^{-5}$
E = $4.678 \times 10^{-5}$

Numerical Example 5

F = 1–9.38   FNo = 1:1.25–1.75   2ω = 51.6°–5.9°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = 7.323 | D14 = 0.636 | N9 = 1.60311 | ν9 = 60.7 |
| R15 = −3.863 | D15 = 0.113 | | |
| R16 = Stop | D16 = 0.227 | | |
| R17 = Aspheric | D17 = 0.454 | N10 = 1.58313 | ν10 = 59.4 |
| R18 = −20.495 | D18 = 0.017 | | |

-continued

| | | | |
|---|---|---|---|
| R19 = 4.405 | D19 = 0.511 | N11 = 1.60311 | ν11 = 60.7 |
| R20 = −14.788 | D20 = 0.227 | | |
| R21 = −3.616 | D21 = 0.170 | N12 = 1.84666 | ν12 = 23.9 |
| R22 = 12.912 | D22 = 0.017 | | |
| R23 = 2.532 | D23 = 0.715 | N13 = 1.60311 | ν13 = 60.7 |
| R24 = −24.129 | D24 = 1.171 | | |
| R25 = 154.185 | D25 = 0.102 | N14 = 1.74950 | ν14 = 35.3 |
| R26 = 1.644 | D26 = 0.166 | | |
| R27 = 5.614 | D27 = 0.295 | N15 = 1.62299 | ν15 = 58.1 |
| R28 = −4.004 | D28 = 0.017 | | |
| R29 = 2.100 | D29 = 0.363 | N16 = 1.59551 | ν16 = 39.2 |
| R30 = −143.370 | D30 = 0.568 | | |
| R31 = ∞ | D31 = 0.681 | N17 = 1.51633 | ν17 = 64.1 |
| R32 = ∞ | | | |

| Lens Separations During Zooming | | | |
|---|---|---|---|
| Focal Length | D5 | D10 | D13 |
| 1 | 0.1639 | 4.3865 | 0.3524 |
| 3.42 | 3.0625 | 0.9004 | 0.9399 |
| 9.38 | 4.3001 | 0.3896 | 0.2131 |

Values of the Aspheric Coefficients $$R = 7.5058$$
$$A = 0$$
$$B = -3.361 \times 10^{-4}$$
$$C = 2.074 \times 10^{-4}$$
$$D = -2.577 \times 10^{-5}$$
$$E = -2.700 \times 10^{-6}$$

TABLE 2

| Condition | Numerical Example | | |
|---|---|---|---|
| | 3 | 4 | 5 |
| (5) f4/fw | 4.29 | 4.28 | 4.29 |
| (6) f51/fw | 4.23 | 4.13 | 4.15 |
| (7) \|R5,5/R5,3\| | 1.20 | 1.13 | 0.82 |
| (8) D51-52/fw | 1.28 | 1.24 | 1.17 |

Figure 4:
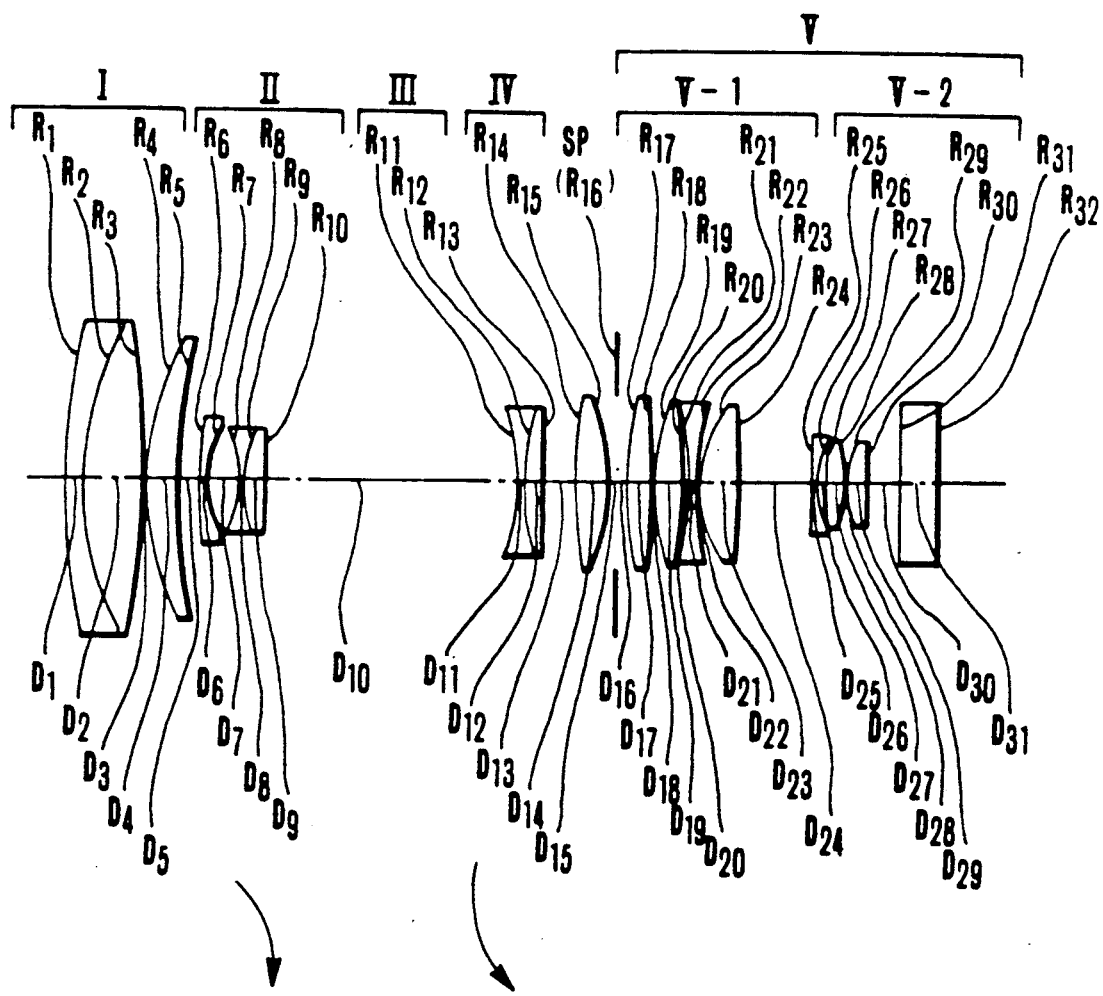
Figure 5A:
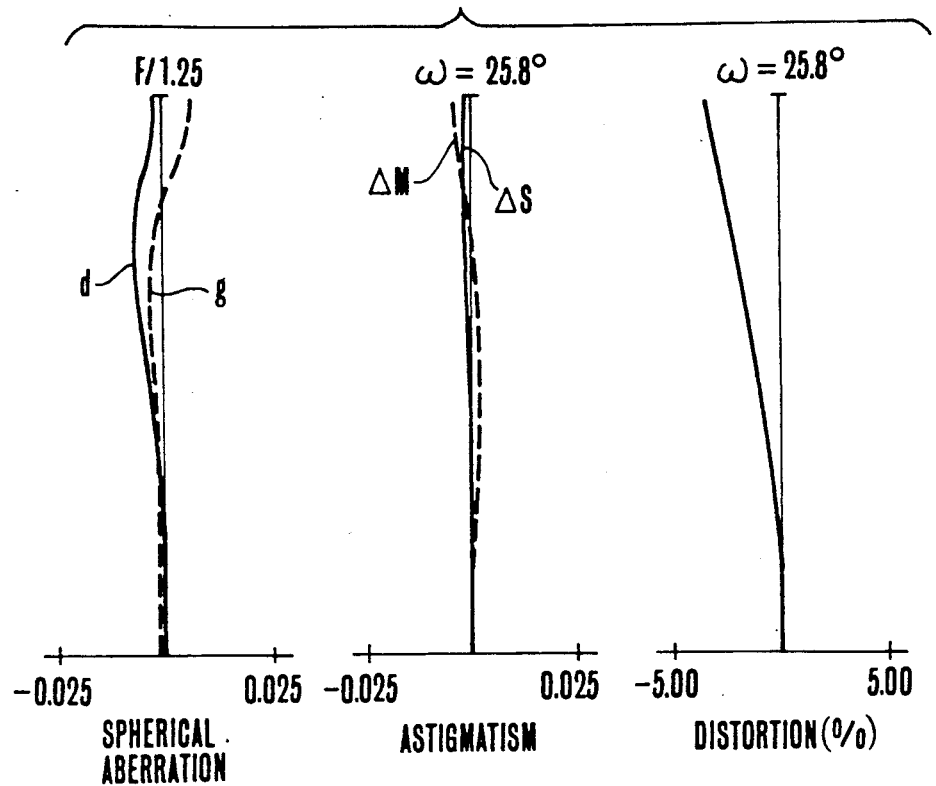
Figure 5B:
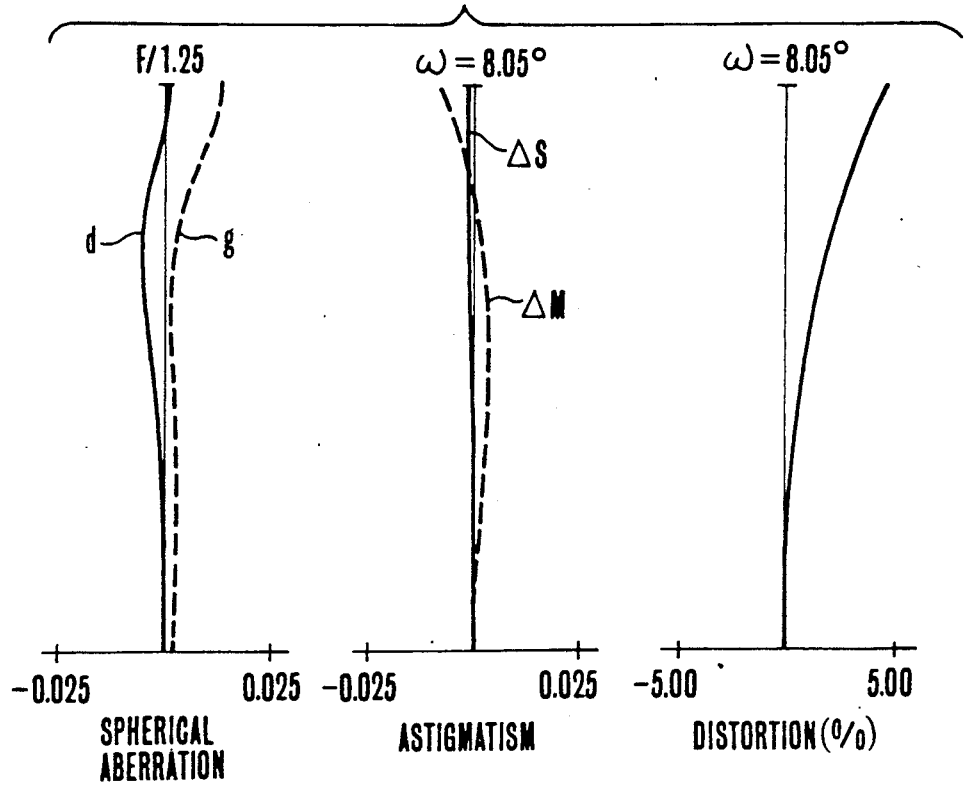
Figure 5C:
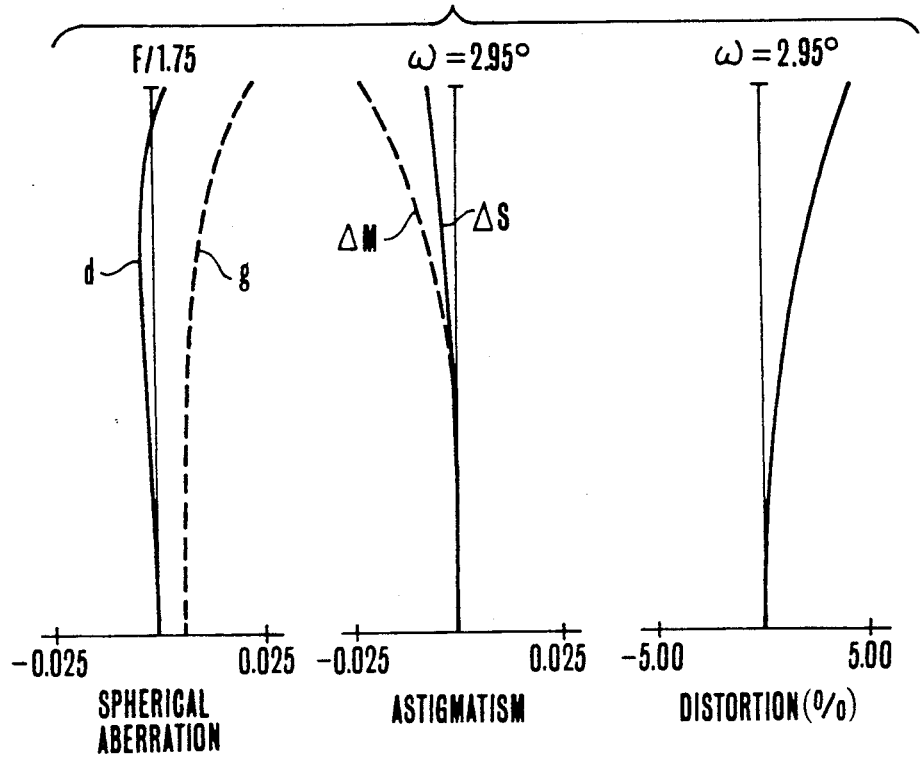
Figure 6A:
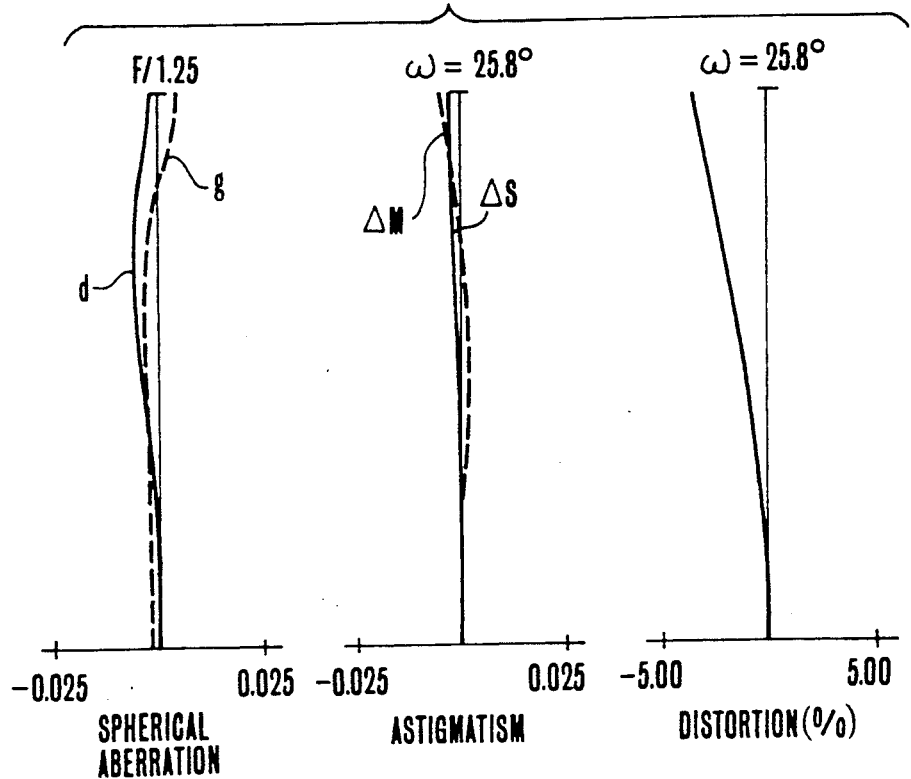
Figure 6B:
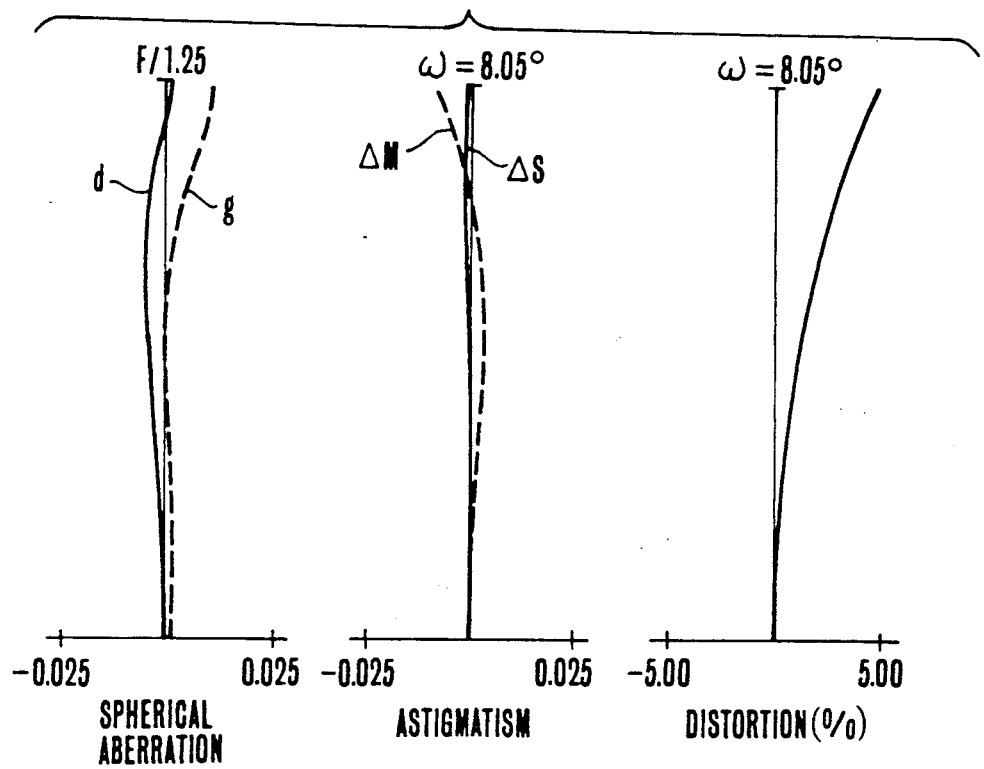
Figure 6C:
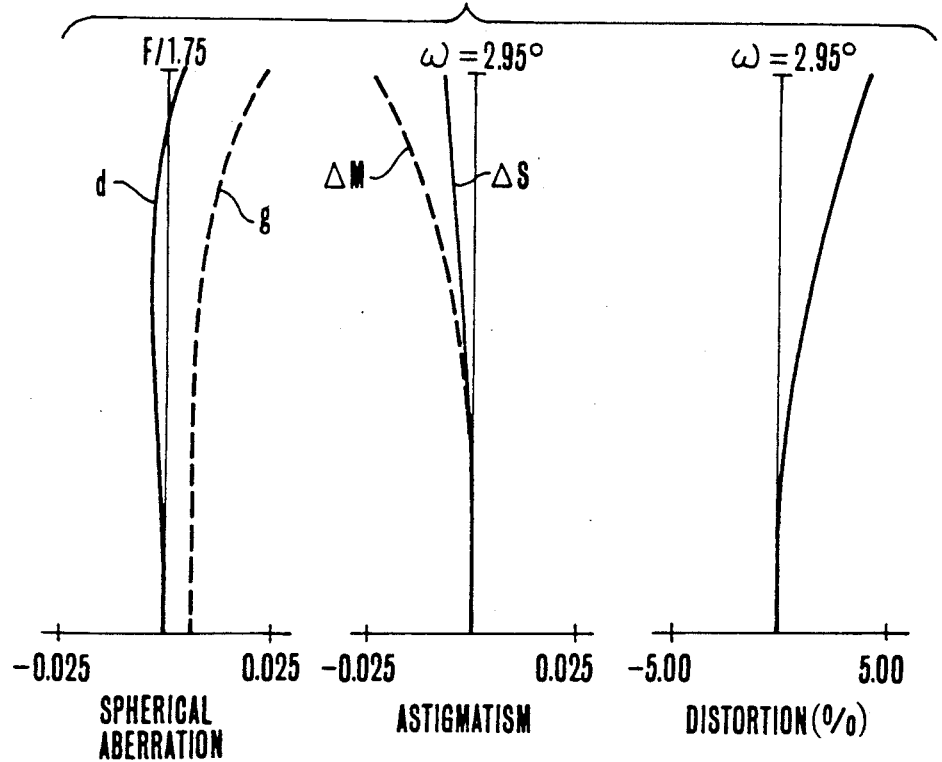
Figure 7A:
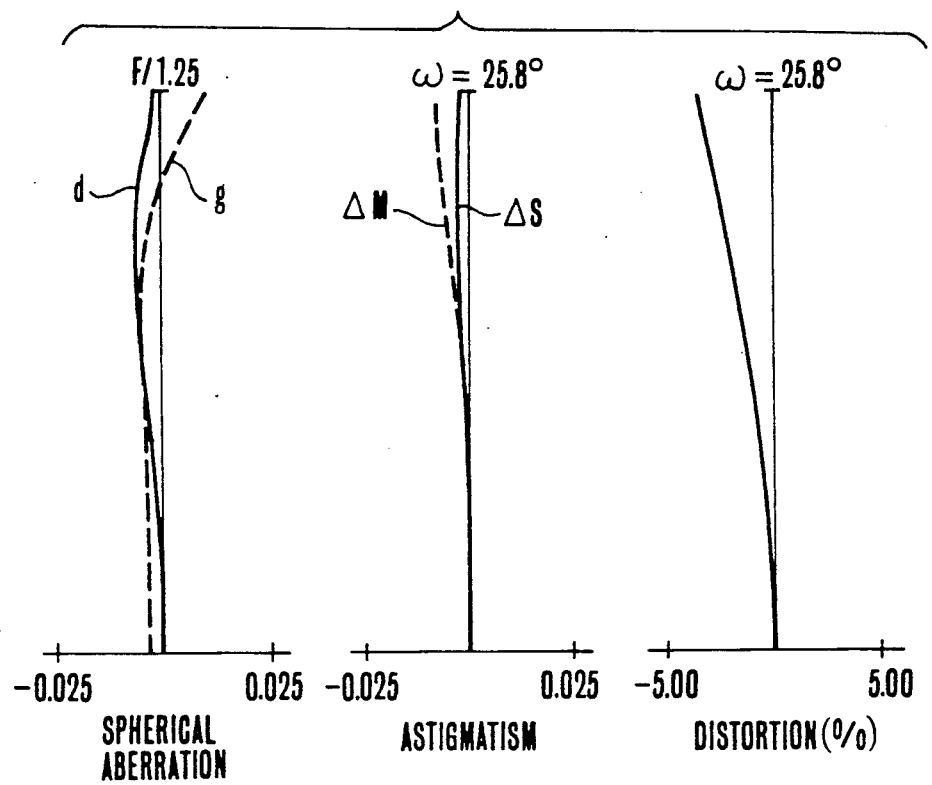
Figure 7B:
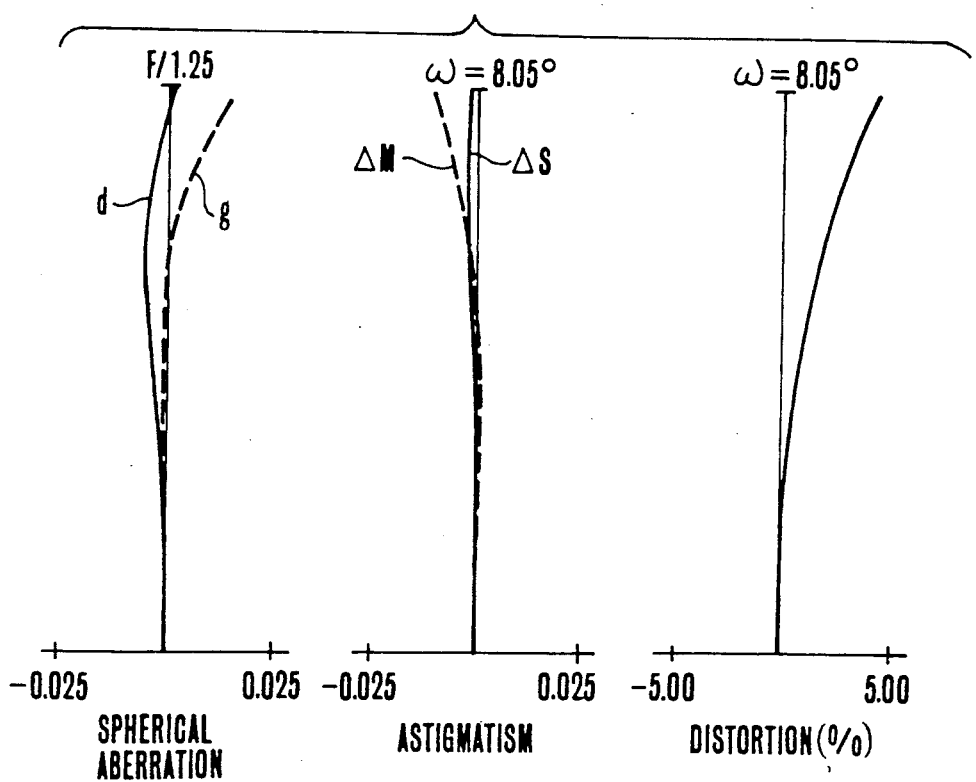
Figure 8:
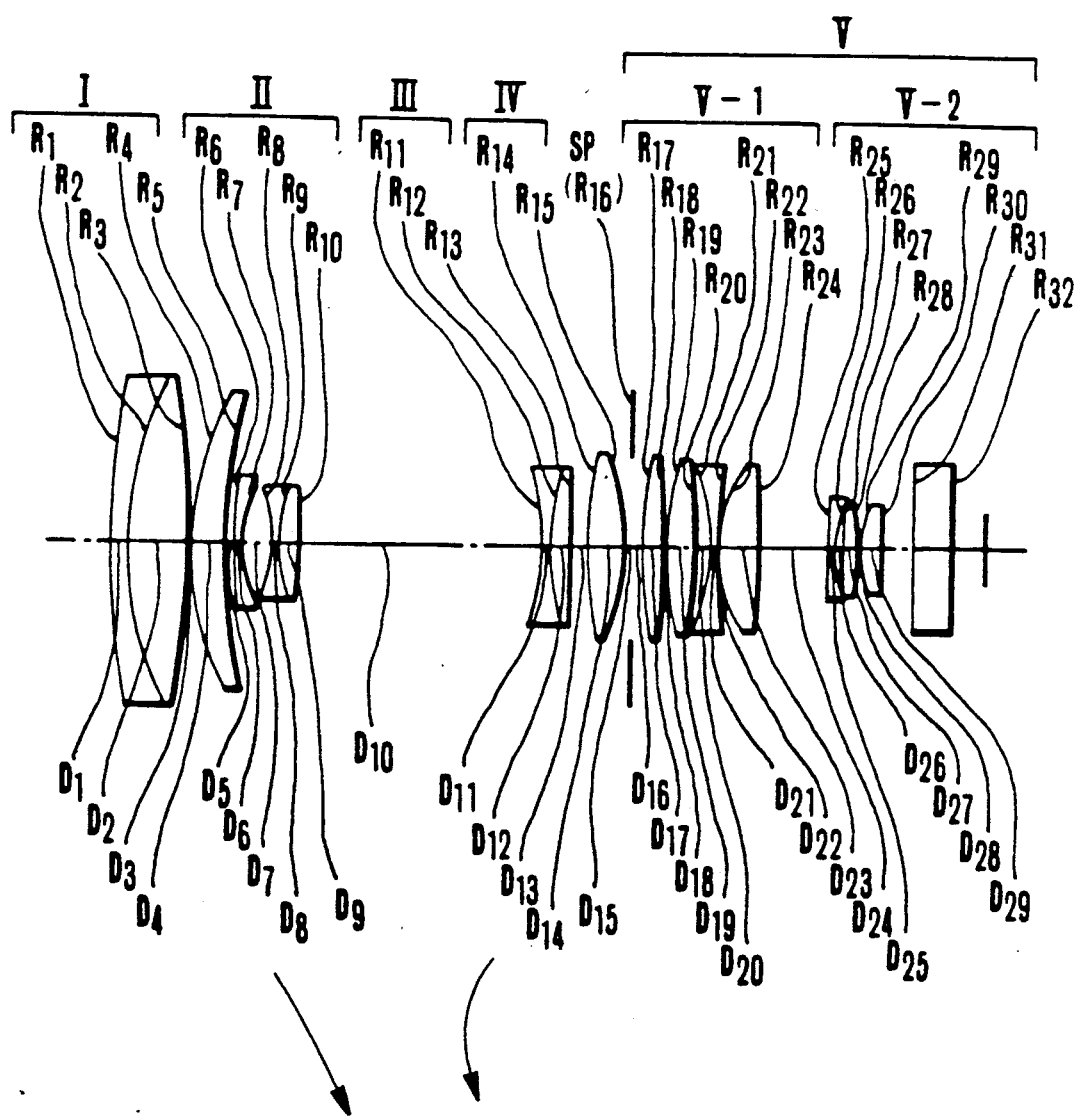
Figure 9C:
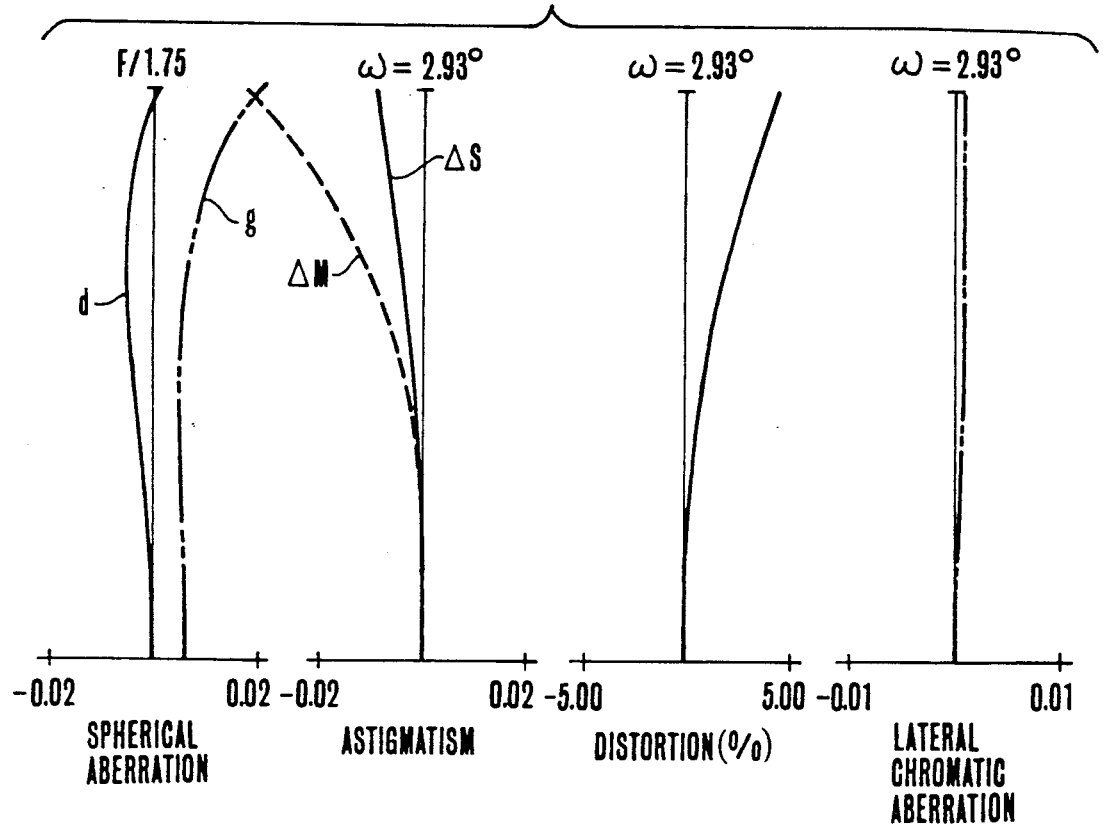
Figure 10A:
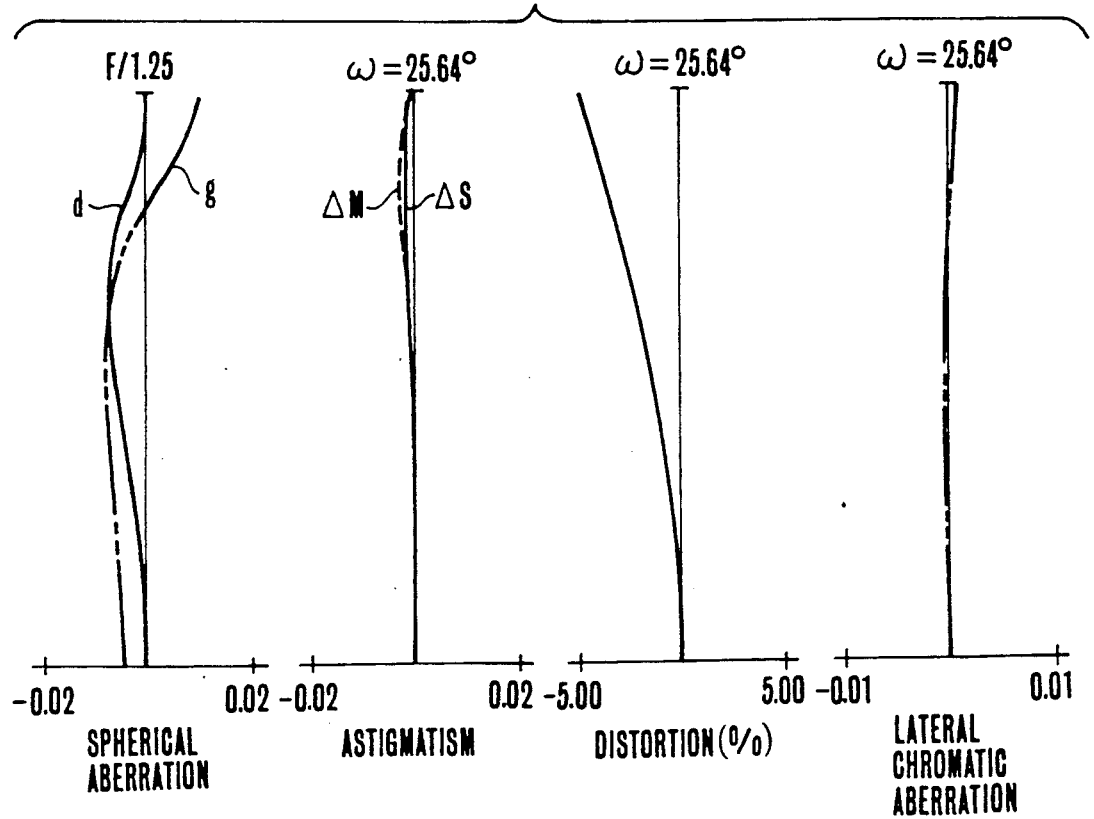
Figure 10B:
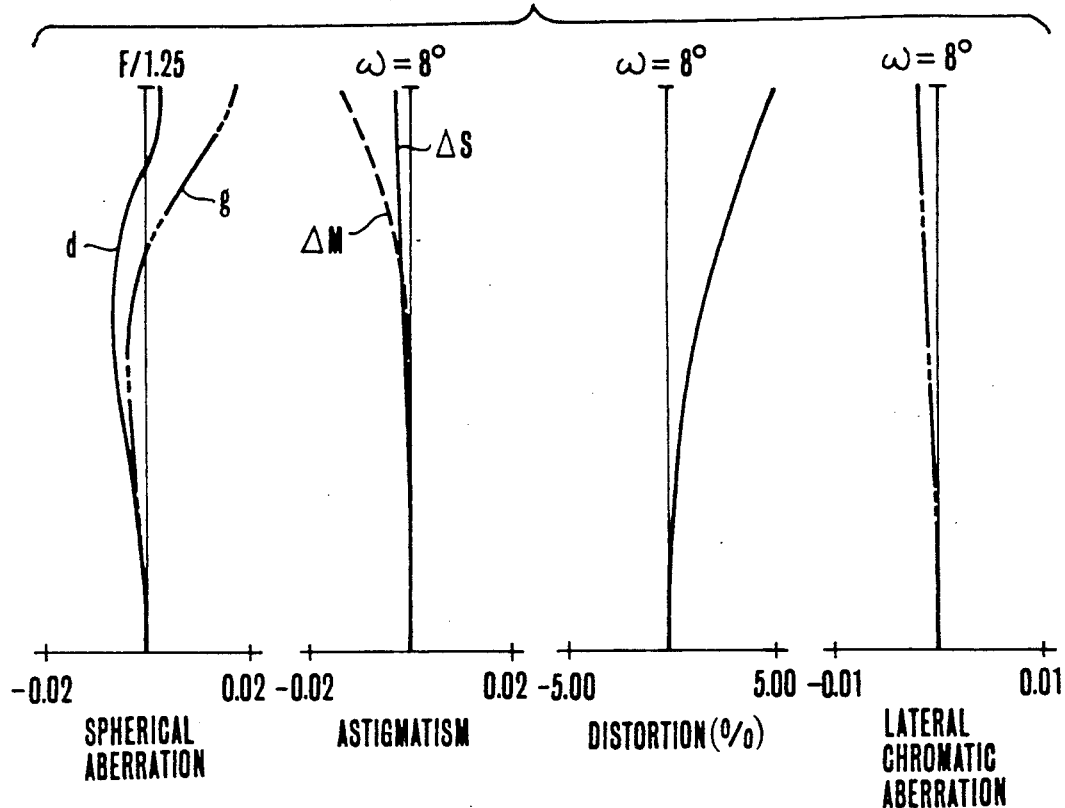
Figure 10C:
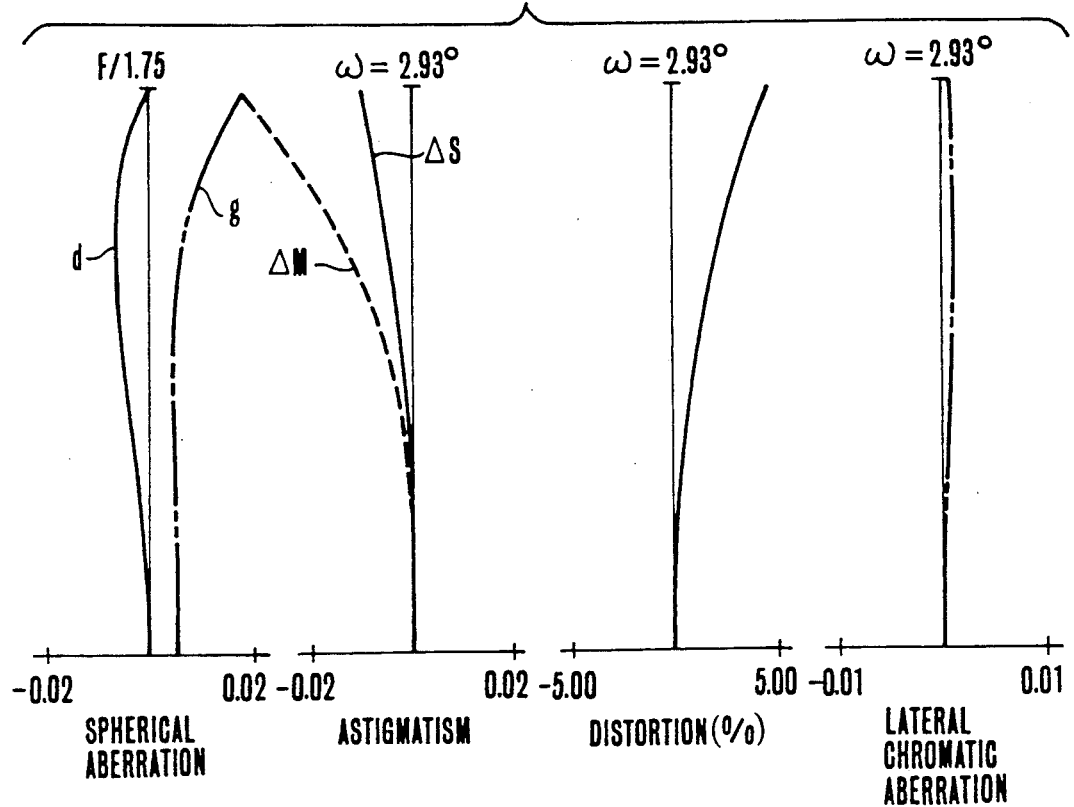
Figure 11A:
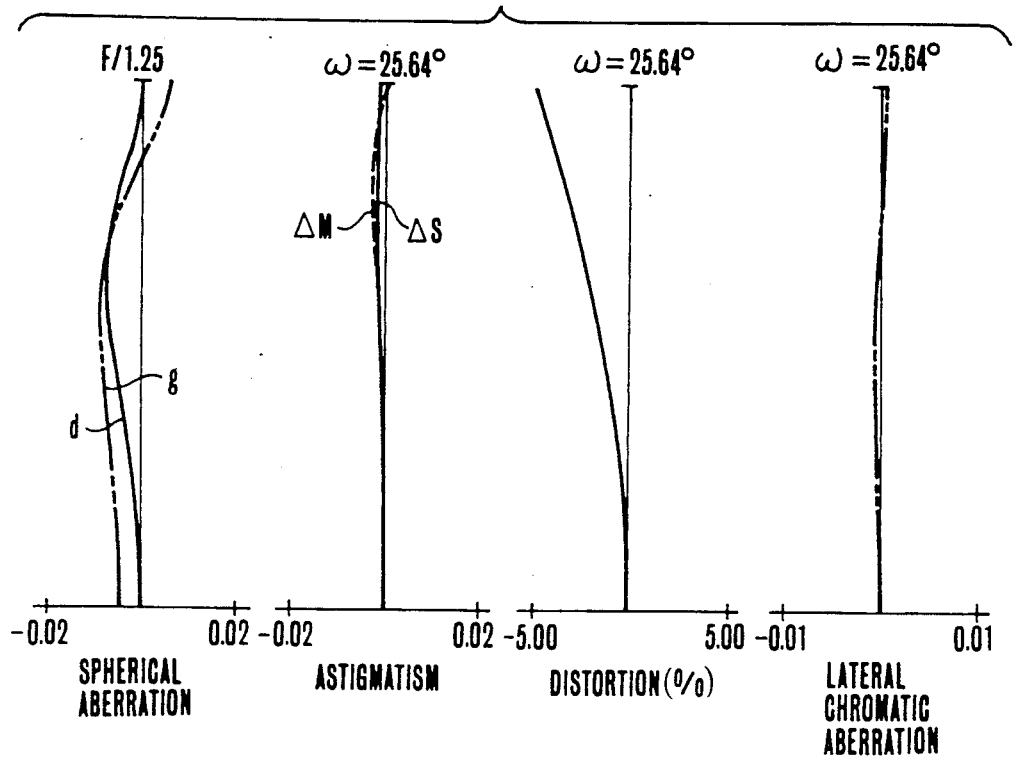
Figure 11B:
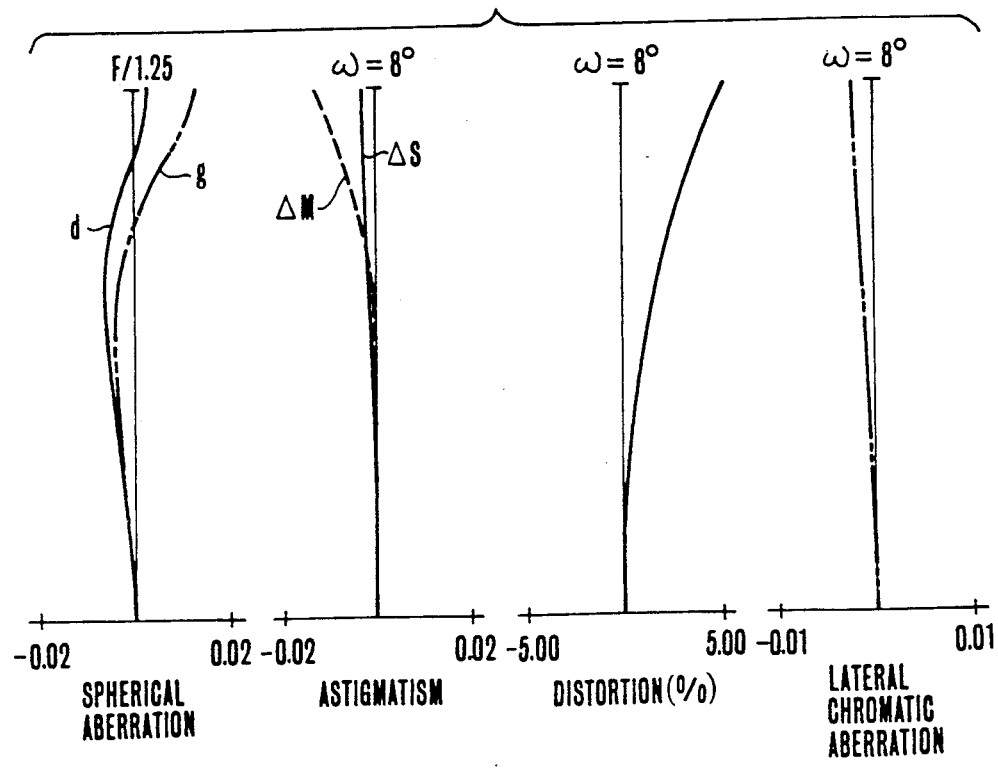
Figure 11C:
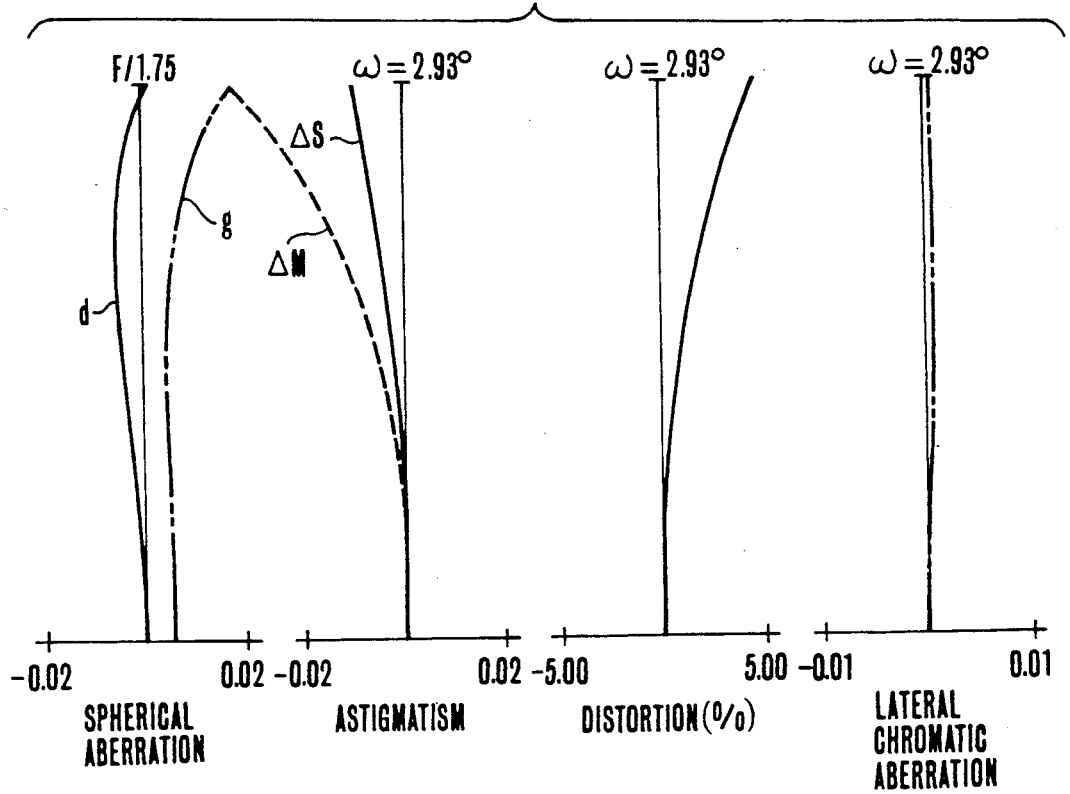
Figure 12A:
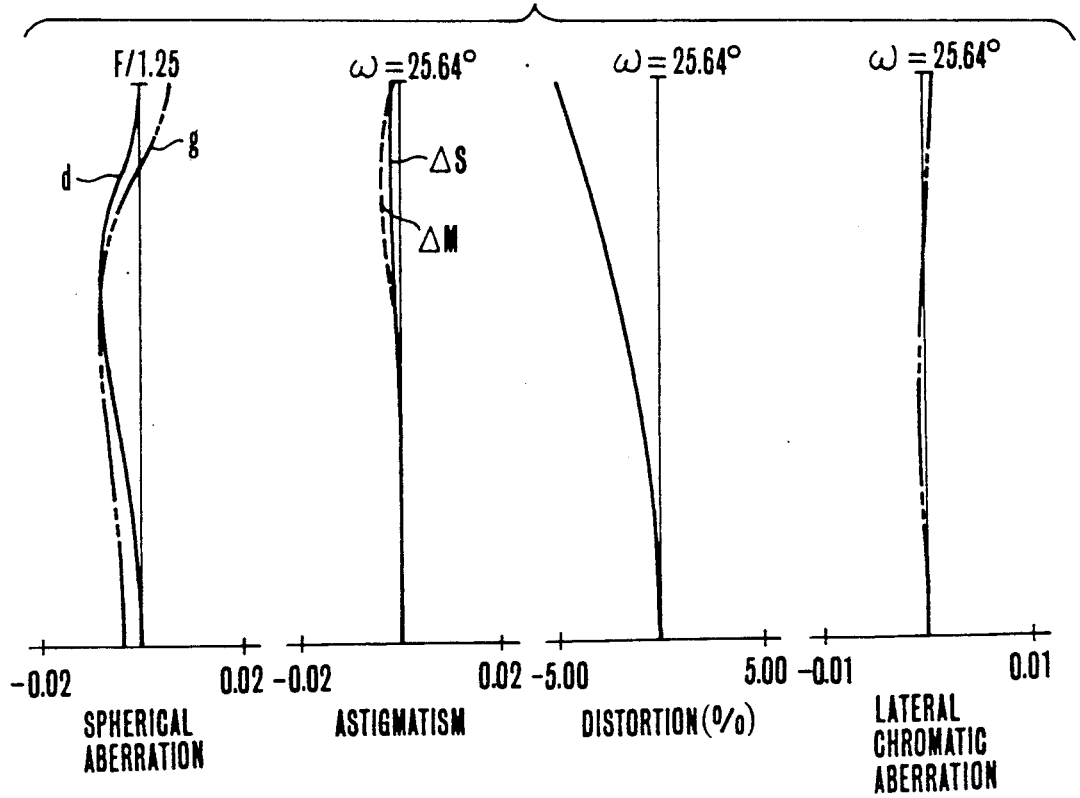
Figure 12B:
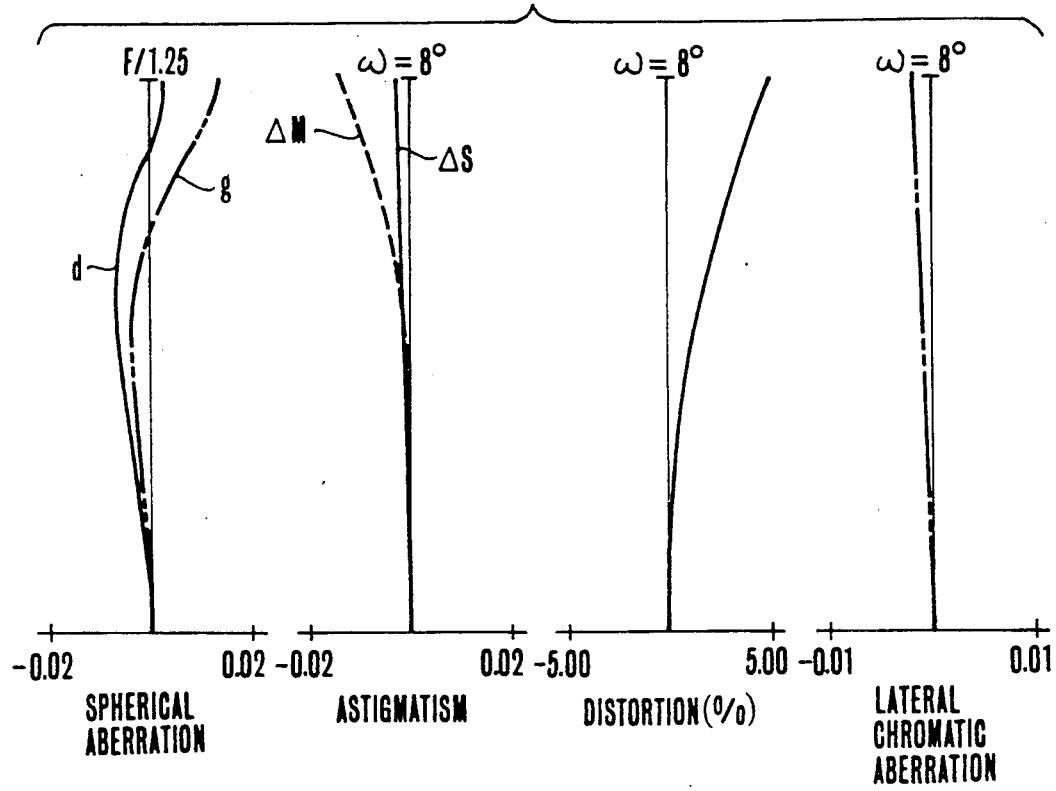
Figure 12C:
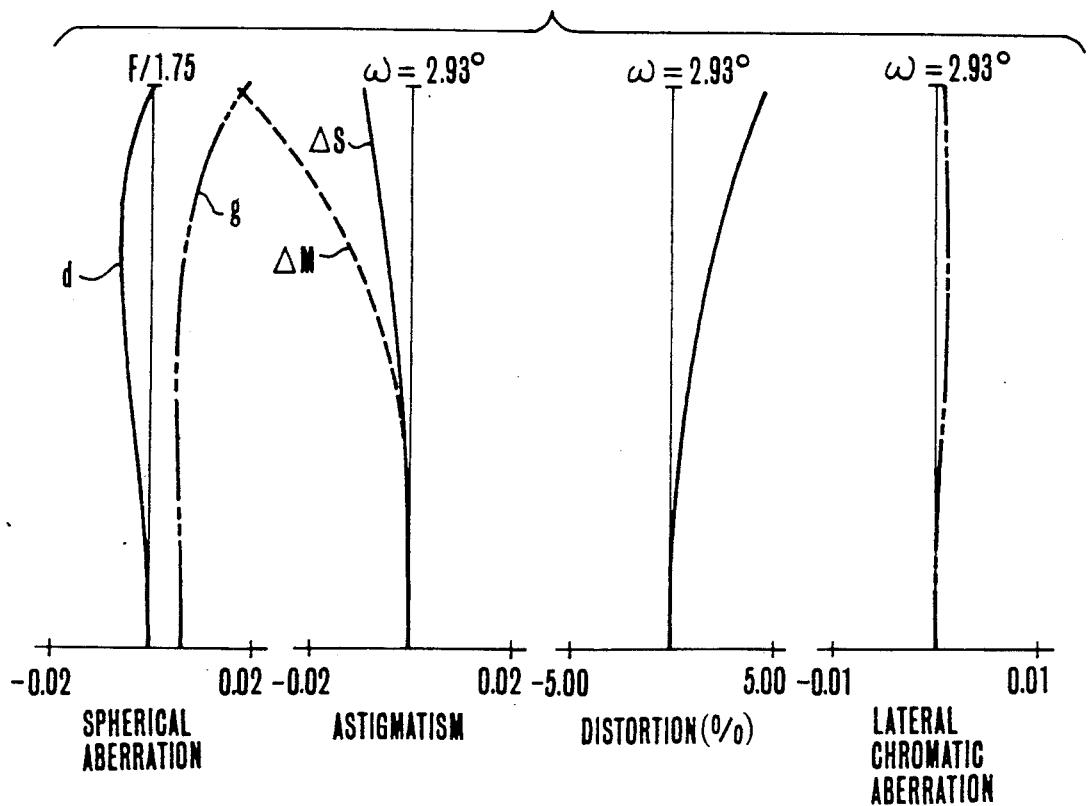

In the above-described embodiments, the high optical performance has been maintained by introducing at least one aspheric surface into the zoom lens. Next, as shown in the longitudinal section view of FIG. 8, a zoom lens which, though having almost the same configuration as that shown in FIG. 4, is made to maintain the high optical performance without introducing any aspheric surface is shown.

The zoom lens comprises, from front to rear, a first lens group I of positive power for focusing, a second lens group II of negative power having the image magnification varying function, a third lens group III of negative refractive power for compensating for the shift of an image plane resulting from the variation of the image magnification, a fourth lens group IV of positive power receptive of the diverging light beam from the third lens group III for producing a diverging light beam, and a fifth lens group V having the image forming function, the fifth lens group V having a front lens sub-group and a rear lens sub-group. The first lens group I comprises a cemented doublet consisting of a negative meniscus-shaped first lens convex toward the front and a bi-convex second lens cemented together at their adjoining surfaces, and a positive meniscus-shaped third lens convex toward the front. The second lens group II comprises a negative meniscus-shaped first lens convex toward the front, and a cemented doublet consisting of a negative second lens of which both surfaces are concave and a positive third lens cemented together at their adjoining surfaces. The third lens group III comprises a cemented doublet consisting of a negative first lens of which both surfaces are concave and a positive second lens cemented together at their adjoining surfaces. The fourth lens group IV comprises a positive first lens of which both surfaces are convex. The front lens sub-group comprises a bi-convex first lens whose front refracting surface is of strong curvature, a bi-convex second lens whose front refracting surface is of strong curvature, a negative third lens turning its front refracting surface of strong concave curvature toward the front, and a positive fourth lens turning its front refracting surface of strong convex curvature toward the front. The rear lens sub-group comprises a negative fifth lens turning its rear refracting surface of strong concave curvature toward the rear, a bi-convex sixth lens, and a positive seventh lens turning its front refracting surface of strong convex curvature toward the front. Letting the radius of curvature of the j-th lens surfaces of the i-th lens group counting from front be denoted by Ri,j, the focal length of the i-th lens group by fi, the focal lengths of the front lens sub-group and the rear lens sub-group by f51 and f52 respectively, the refractive index and Abbe number of the material of the j-th lens element of the i-th lens group by Ni,j and νi,j respectively, the j-th axial lens thickness or air separation of the i-th lens group by Di,j and the mean refractive index of the materials of the first and second lenses of the fifth lens group by NA, the following conditions are set forth:

$$4.5 < ((R5,1 + R5,3)/(NA - 1))(1/f51) < 7.0 \quad (9)$$

$$0.125 < (N5,3 - 1)f5/Rf,6 < 0.25 \quad (10)$$

$$0.55 < (R5,13/(N5,7 - 1))(1/f52) < 0.65 \quad (11)$$

$$11 < (\nu5,6 + \nu5,7)/2 - \nu5,5 < 15 \quad (12)$$

$$0.3 < D5,8/f5 < 0.4 \quad (13)$$

When the above-described conditions are satisfied, the aberrations attributable to the increases of the aperture ratio and the magnification range are corrected well for high optical performance over the entire magnification range.

In particular, the aberrations which accompany the increase of the aperture ratio, for example, spherical aberration, astigmatism and chromatic aberrations, are corrected well by appropriately setting up the lens form and the refractive index and dispersion of each lens element of the fifth lens group.

Also, the residual aberrations of the magnification varying system, for example, spherical aberration and coma, are corrected in good balance.

Further, by setting the refractive power of the fourth lens group so that the the divergent light beam from the third lens group emerges in the diverging state, the reflected light bundle from the image sensor and the filters is advantageously prevented from producing ghost or flare as it enters again the image sensor after the reflection from any arbitrary lens surface.

The technical significance of each of the before-described conditions is explained below.

The inequalities of condition (9) correspond to the sum of the refractive powers of the front surfaces of both the first and second lenses in the fifth lens group. When the refractive power is too weak as exceeding the upper limit, large coma flare is produced. When the lower limit is exceeded, the residual amount of zonal spherical spherical aberration increases objectionably.

The inequalities of condition (10) concern with the refractive power of the rear lens surface of the negative third lens whose front surface is concave toward the front in the fifth lens group. When the refractive power is too strong as exceeding the upper limit, large higher-order aberrations are produced. When the refractive power is too weak as exceeding the lower limit, the reflected light from the image pickup surface reflects from this lens surface and focuses itself in the neighborhood of the image pickup surface. Therefore, ghost or flare becomes easy to produce.

The inequalities of condition (11) concern with the refractive power of the front lens surface of the third lens in the fifth lens group and have an aim mainly to well correct distortion and curvature of field. When the refractive power is too weak as exceeding the upper limit, the negative distortion becomes too large on the wide-angle end. When the refractive power is too strong as exceeding the lower limit, the amount of curvature of the meridional image surface comes to increase. So, no good result is attained.

The inequalities of condition (12) give a proper range for the difference between the mean value of the Abbe numbers of the two positive lenses and the Abbe number of the negative lens in the rear lens sub-group and have an aim to well correct chromatic aberrations. When the Abbe number difference is too large as exceeding the upper limit, the longitudinal and lateral chromatic aberrations become over-corrected, and the resolving power comes to lower. When the lower limit is exceeded, the longitudinal and lateral chromatic aberrations become under-corrected and running of colors occurs in the marginal zone of the image frame, causing the image quality to lower objectionably.

The inequalities of condition (13) give a proper range for the air separation by which the fifth lens group is divided into two parts or the front lens sub-group and the rear lens sub-group as it is the widest therein, and have an aim to correct on-axial aberrations and off-axial aberrations in good balance.

When the air separation is too wide as exceeding the upper limit, the physical length of the fifth lens group increases largely, and it becomes difficult to well correct the on-axial aberrations such as spherical aberration. When the air separation is too narrow as exceeding the lower limit, the spherical aberration becomes over-corrected and the difficulty of correcting the off-axial aberrations such as astigmatism and coma in good balance comes to increase.

Incidentally, in the present embodiment, the term "the front refracting surface of strong curvature" means that it is compared with the curvature of the other lens surface or the rear lens surface.

Next, four numerical examples 6 to 9 of the invention are shown.

Also, the numerical values of the factors in the above-cited conditions (9) to (13) for the numerical examples 6 to 9 are shown in Table-3.

Numerical Example 6

F = 1-9.38    FNo = 1:1.24-1.75    2ω = 51.3°-5.9°

| | | | |
|---|---|---|---|
| R1 = 14.793 | D1 = 0.284 | N1 = 1.8058 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = 7.323 | D14 = 0.636 | N9 = 1.60311 | ν9 = 60.7 |
| R15 = −3.863 | D15 = 0.113 | | |
| R16 = Stop | D16 = 0.227 | | |
| R17 = 8.037 | D17 = 0.397 | N10 = 1.58913 | ν10 = 61.2 |
| R18 = −20.698 | D18 = 0.017 | | |
| R19 = 4.395 | D19 = 0.511 | N11 = 1.58913 | ν11 = 61.2 |
| R20 = −16.969 | D20 = 0.255 | | |
| R21 = −3.553 | D21 = 0.170 | N12 = 1.84666 | ν12 = 23.9 |
| R22 = 16.193 | D22 = 0.017 | | |
| R23 = 2.546 | D23 = 0.715 | N13 = 1.60311 | ν13 = 60.7 |
| R24 = −25.020 | D24 = 1.230 | | |
| R25 = −249.278 | D25 = 0.102 | N14 = 1.74950 | ν14 = 35.3 |
| R26 = 1.647 | D26 = 0.147 | | |
| R27 = 4.990 | D27 = 0.295 | N15 = 1.62299 | ν15 = 58.1 |
| R28 = −3.779 | D28 = 0.017 | | |
| R29 = 2.003 | D29 = 0.363 | N16 = 1.59551 | ν16 = 39.2 |
| R30 = 32.532 | D30 = 0.568 | | |
| R31 = ∞ | D31 = 0.681 | N17 = 1.51633 | ν17 = 64.1 |
| R32 = ∞ | | | |

| Lens Separations During Zooming | | | |
|---|---|---|---|
| | D5 | D10 | D13 |
| Wide-angle End | 0.164 | 4.387 | 0.352 |
| Telephoto End | 4.300 | 0.390 | 0.213 |

Numerical Example 7

F = 1-9.38    FNo = 1:1.25-1.75    2ω = 51.3°-5.9°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |
| R5 = 10.825 | D5 = Variable | | |
| R6 = 16.380 | D6 = 0.125 | N4 = 1.83400 | ν4 = 37.2 |
| R7 = 1.876 | D7 = 0.537 | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | |
| R14 = 7.323 | D14 = 0.636 | N9 = 1.60311 | ν9 = 60.7 |
| R15 = −3.863 | D15 = 0.113 | | |
| R16 = Stop | D16 = 0.227 | | |
| R17 = 7.919 | D17 = 0.397 | N10 = 1.58913 | ν10 = 61.2 |
| R18 = −22.634 | D18 = 0.017 | | |
| R19 = 4.330 | D19 = 0.511 | N11 = 1.58913 | ν11 = 61.2 |
| R20 = −16.765 | D20 = 0.255 | | |
| R21 = −3.574 | D21 = 0.170 | N12 = 1.84666 | ν12 = 23.9 |
| R22 = 15.571 | D22 = 0.17 | | |
| R23 = 2.559 | D23 = 0.715 | N13 = 1.60311 | ν13 = 60.7 |
| R24 = −24.275 | D24 = 1.232 | | |
| R25 = −304.805 | D25 = 0.102 | N14 = 1.74950 | ν14 = 35.3 |
| R26 = 1.647 | D26 = 0.147 | | |
| R27 = 4.933 | D27 = 0.295 | N15 = 1.62299 | ν15 = 58.1 |
| R28 = −3.808 | D28 = 0.017 | | |
| R29 = 2.009 | D29 = 0.363 | N16 = 1.59551 | ν16 = 39.2 |
| R30 = 34.483 | D30 = 0.568 | | |
| R31 = ∞ | D31 = 0.681 | N17 = 1.51633 | ν17 = 64.1 |
| R32 = ∞ | | | |

| Lens Separations During Zooming | | | |
|---|---|---|---|
| | D5 | D10 | D13 |
| Wide-angle End | 0.164 | 4.387 | 0.352 |
| Telephoto End | 4.300 | 0.390 | 0.213 |

Numerical Example 8

F = 1-9.38    FNo = 1:1.25-1.75    2ω = 51.3°-5.9°

| | | | |
|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | |
| R4 = 4.891 | D4 = 0.556 | N3 = 1.69680 | ν3 = 55.5 |

-continued

| | | | | |
|---|---|---|---|---|
| R5 = 10.825 | D5 = Variable | | | |
| R6 = 16.380 | D6 = 0.125 | N4 = 1.83400 | ν4 = 37.2 |
| R7 = 1.876 | D7 = 0.537 | | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | | |
| R14 = 7.323 | D14 = 0.636 | N9 = 1.60311 | ν9 = 60.7 |
| R15 = −3.863 | D15 = 0.113 | | | |
| R16 = Stop | D16 = 0.227 | | | |
| R17 = 7.464 | D17 = 0.397 | N10 = 1.51633 | ν10 = 64.1 |
| R18 = −13.380 | D18 = 0.017 | | | |
| R19 = 4.353 | D19 = 0.511 | N11 = 1.51633 | ν11 = 64.1 |
| R20 = −12.945 | D20 = 0.221 | | | |
| R21 = −3.528 | D21 = 0.170 | N12 = 1.84666 | ν12 = 23.9 |
| R22 = 22.597 | D22 = 0.017 | | | |
| R23 = 2.520 | D23 = 0.715 | N13 = 1.60311 | ν13 = 60.7 |
| R24 = −41.352 | D24 = 1.293 | | | |
| R25 = −42.765 | D25 = 0.102 | N14 = 1.74950 | ν14 = 35.3 |
| R26 = 1.634 | D26 = 0.147 | | | |
| R27 = 4.958 | D27 = 0.295 | N15 = 1.63854 | ν15 = 55.4 |
| R28 = −3.974 | D28 = 0.017 | | | |
| R29 = 1.966 | D29 = 0.363 | N16 = 1.59551 | ν16 = 39.2 |
| R30 = 113.422 | D30 = 0.568 | | | |
| R31 = ∞ | D31 = 0.681 | N17 = 1.516d-33 | ν17 = 64.1 |
| R32 = ∞ | | | | |

Lens Separations During Zooming

| | D5 | D10 | D13 |
|---|---|---|---|
| Wide-angle End | 0.164 | 4.387 | 0.352 |
| Telephoto End | 4.300 | 0.390 | 0.213 |

Numerical Example 9

F = 1–9.38    FNo = 1:1.25–1.75    2ω = 51.3°–5.9°

| | | | | |
|---|---|---|---|---|
| R1 = 14.793 | D1 = 0.284 | N1 = 1.80518 | ν1 = 25.4 |
| R2 = 5.846 | D2 = 1.056 | N2 = 1.60311 | ν2 = 60.7 |
| R3 = −15.311 | D3 = 0.022 | | | |
| R4 = 4.891 | D4 = 0.556 | N3 = 1.69680 | ν3 = 55.5 |
| R5 = 10.825 | D5 = Variable | | | |
| R6 = 16.380 | D6 = 0.125 | N4 = 1.83400 | ν4 = 37.2 |
| R7 = 1.876 | D7 = 0.537 | | | |
| R8 = −2.246 | D8 = 0.102 | N5 = 1.71299 | ν5 = 53.8 |
| R9 = 2.247 | D9 = 0.397 | N6 = 1.84666 | ν6 = 23.9 |
| R10 = −18.910 | D10 = Variable | | | |
| R11 = −3.676 | D11 = 0.136 | N7 = 1.71999 | ν7 = 50.3 |
| R12 = 4.372 | D12 = 0.295 | N8 = 1.80518 | ν8 = 25.4 |
| R13 = 63.754 | D13 = Variable | | | |
| R14 = 7.323 | D14 = 0.636 | N9 = 1.60311 | ν9 = 60.7 |
| R15 = −3.863 | D15 = 0.113 | | | |
| R16 = Stop | D16 = 0.227 | | | |
| R17 = 12.108 | D17 = 0.340 | N10 = 1.60311 | ν10 = 60.7 |
| R18 = −13.818 | D18 = 0.017 | | | |
| R19 = 4.413 | D19 = 0.511 | N11 = 1.60311 | ν11 = 60.7 |
| R20 = −12.161 | D20 = 0.239 | | | |
| R21 = −3.553 | D21 = 0.170 | N12 = 1.84666 | ν12 = 23.9 |
| R22 = 13.241 | D22 = 0.017 | | | |
| R23 = 2.558 | D23 = 0.625 | N13 = 1.69680 | ν13 = 55.5 |
| R24 = −232.810 | D24 = 1.250 | | | |
| R25 = −747.298 | D25 = 0.102 | N14 = 1.83400 | ν14 = 37.2 |
| R26 = 1.650 | D26 = 0.170 | | | |
| R27 = 4.693 | D27 = 0.386 | N15 = 1.60311 | ν15 = 60.7 |
| R28 = −3.310 | D28 = 0.017 | | | |
| R29 = 1.966 | D29 = 0.363 | N16 = 1.56732 | ν16 = 42.8 |
| R30 = 87.184 | D30 = 0.568 | | | |
| R31 = ∞ | D31 = 0.681 | N17 = 1.51633 | ν17 = 64.1 |
| R32 = ∞ | | | | |

Lens Separations During Zooming

| | D5 | D10 | D13 |
|---|---|---|---|
| Wide-angle End | 0.164 | 4.387 | 0.352 |
| Telephoto End | 4.300 | 0.390 | 0.213 |

TABLE 3

| | Numerical Example | | | |
|---|---|---|---|---|
| Condition | 6 | 7 | 8 | 9 |
| (9) | 4.972 | 4.896 | 5.419 | 6.816 |
| (10) | 0.192 | 0.199 | 0.138 | 0.235 |
| (11) | 0.595 | 0.599 | 0.599 | 0.622 |
| (12) | 13.41 | 13.41 | 12.025 | 14.595 |
| (13) | 0.337 | 0.337 | 0.352 | 0.340 |
| f5,1 | 4.2448 | 4.2473 | 4.2235 | 4.0193 |
| f5,2 | 5.6534 | 5.6353 | 5.5128 | 5.5694 |
| f5 | 3.6632 | 3.6637 | 3.6727 | 3.6724 |
| NA | 1.58913 | 1.58913 | 1.51633 | 1.60311 |

As has been described above, according to the present invention, in the 5-group zoom lens, proper rules of design are set forth, so that the aperture ratio is increased to F 1.2 or thereabout and the magnification range to 10. Accordingly, a zoom lens having the high magnification range and the high optical performance capable of well correcting aberrations over the entire magnification range and suited to a photographic camera or video camera can be obtained.

What is claimed is:

1. A zoom lens comprising:
   from front to rear,
   a first lens group of positive refractive power for focusing;
   a second lens group of negative refractive power having a function of varying the image magnification;
   a third lens group of negative refractive power for compensating for the shift of an image plane resulting from the variation of the image magnification;
   a fourth lens unit of positive refractive power of which both surfaces are convex and of which the rear surface is of strong curvature;
   a stop; and
   a fifth lens group having the image formign function, said fifth lens group having a front lens sub-group comprising a first lens of which both surfaces are convex, a negative second lens whose front surface is concave and a third lens whose front surface is of strong curvature, and a rear lens sub-group comprising a negative fourth lens whose rear surface is concave, a fifth lens of which both surfaces are convex, and a positive sixth lens whose front surface is of strong curvature, and said zoom lens satisfying the following conditions:

$$3.9 < f4/fw < 4.5$$

$$3.8 < f51/f2 < 4.2$$

$$1.25 < D51\text{-}52/fw < 1.39$$

where f4 is a focal length of said fourth lens gorup, f51 is a focal length of said front lens sub-group, fw is the shortest focal length of the entire lens system, and D51-52 is an axial air separation between said front lens sub-group and said rear lens sub-group.

2. A zoom lens according to claim 1, wherein said fourth lens group has at least one aspheric surface of such a shape that the radius of curvature gets progressively larger from the center to the margin.

3. A zoom lens comprising:
   from front to rear,
   a first lens group of positive refractive power for focusing;

a second lens group of negative refractive power having a function of varying the image magnification;

a third lens group for compensating for the shift of an image plane resulting from the variation of the image magnification;

a fourth lens unit of positive refractive power of which both surfaces are convex and of which the rear lens surface is of strong curvature;

a stop; and a fifth lens group having the image forming function, said fifth lens group having a front lens sub-group comprising a first lens of which both surfaces are convex, a second lens of which both surfaces are convex, a third lens of which both surfaces are concave, and a positive fourth lens of which the front surface is of strong curvature and a rear lens sub-group comprising a negative fifth lens of which the rear surface is concave, a sixth lens of which both surfaces are convex and a positive seventh lens of which the front surface is of strong curvature, and said zoom lens satisfying the following conditions:

$3.9 - f4/fw < 4.5$ $3.8 < f51/fw < 4.4$ $0.7 < |R5,5/R5,3| < 1.3$ $1.05 < D51\text{-}52/fw < 1.35$ where f4 is a focal length of said fourth lens group, f51 is a focal length of said front lens sub-group, fw is the shortest focal length of the entire lens system, R5,i is a radius of curvature of the i-th lens surface counting from front in said fifth lens group, and D51-52 is an axial air separation between said front lens sub-group and said rear lens sub-group.

4. A zoom lens according to claim 3, wherein said front lens sub-group has at least one aspheric surface of such a shape that the radius of curvature gets progressively larger from the center to the margin.

5. A zoom lens comprising:

from front to rear, a first lens group of positive refractive power for focusing;

a second lens group of negative refractive power having a function of varying the image magnification;

a third lens group of negative refractive power for compensating for the shift of an image plane resulting from the variation of the iamge magnification;

a fixed fourth lens group comprising a single lens with a positive refractive power wherein a divergent light beam from said third lens group that is incident to a front surface thereof will exit from a rear surface thereof while maintained in the divergent state;

a fixed fifth lens group having the image forming function, said fifth lens group having a front lens sub-group comprising a first lens of which both surfaces are convex, a second lens of which both surfaces are convex and of which the front surface is of strong curvature, a negative third lens of which the front surface is of strong concave curvature, and a positive fourth lens of which the front surface is of strong convex curvature, and a rear lens sub-group comprising a negative fifth lens of which the rear surface is of strong concave curvature, a sixth lens of which both surfaces are convex, and a positive seventh lens of which the front surface of strong convex curvature, and said zoom lens satisfying the following conditions:

$4.5 < ((R5,1+R5,3)/NA-1))(1f51) < 7.0$ $0.125 < (N5, 3-1)f5/R5,6 < 0.25$ $0.55 < ((R5,13/(N5,7-1))(1/f52) < 0.65$ $11 < (vf,6+v5,7)/2 - v5,5 < 15$ $0.3 < D5,8/f5 < 0.4$ where Ri,j is a radius of curvature of the j-th lens surface in the i-th lens group, fi is a focal length of the i-th lens group, f51 and f52 are focal lengths of said front lens sub-group and said rear lens sub-group respectively, Ni, j and vi, j are respectively a refractive index and an Abbe number of the material of the j-th lens element in the i-th lens group, Di,j is the j-th lens thickness or air separation in the i-th lens group and NA is a means refractive index of the materials of said first and said second lenses.

6. A zoom lens according to cliam 5, wherein said first lens group comprises a cemented lens of a negative meniscus-shaped first lens convex toward the front and a bi-convex second lens, and a positive meniscus-shaped third lens convex toward the front, said second lens group comprises a negative meniscus-shaped first lens convex toward front, and a cemented lens of a negative second lens of which both surfaces are concave and a positive third lens, said third lens group comprises a cemented lens of a negative first lens of which both surfaces are concave, and a positive second lens, and said fourth lens group comprises a positive lens of which both surfaces are convex.

* * * * *

UNITED STATES PATENT AND TRADEMARK OFFICE
CERTIFICATE OF CORRECTION

PATENT NO. : 5,050,972
DATED : September 24, 1991
INVENTOR(S) : Hitoshi Mukaiya, et al It is certified that error appears in the above-identified patent and that said Letters Patent is hereby corrected as shown below:

<u>IN THE ABSTRACT</u>

Line 9, "groug" should read --group--.

Line 24, "1-th" should read --ith--.

<u>Column 1:</u>

Line 54, "increase largely" should read --increase--.

<u>Column 2:</u>

Line 56, "1.05 < R5,2/R5,3" should read --R5,2/R5,3 is approximately 1.35--.

<u>Column 3:</u>

Line 27, "light," should read --light--.

<u>Column 5:</u>

Line 50, "$X=(1/R)H^2/(1+(H/R^2)^{1/2})+AH^2+BH^4+CH^6+DH^8+EH^{10}$" should read --$X+(1/R)H^2/1+(1-H/R)^2)^{1/2})+AH^2+BH^4+CH^6+DH^8+EH^{10}$--.

<u>Column 6:</u>

Line 32, "D=2.6917x10-4" should read --$D=2.6917 \times 10^{-4}$--.

Line 33, "E=-1.4208x10-4" should read --$E=1.4208 \times 10^{-4}$--.

UNITED STATES PATENT AND TRADEMARK OFFICE
CERTIFICATE OF CORRECTION

PATENT NO. : 5,050,972
DATED : September 24, 1991
INVENTOR(S) : HITOSHI MUKAIYA, ET AL.

It is certified that error appears in the above-identified patent and that said Letters Patent is hereby corrected as shown below:

Column 10:

Line 21, "respecti,vely," should read --respectively,--.

Line 29, "0.125<(N5,3-1)f5/Rf,6<0.25" should read --0.125<(N5,3-1)f5/R5,6<0.25--.

Line 66, "spherical" (second occurrence) should be deleted.

Column 11: line 60

NUM EXP 6, "FNo=1:1.24-1.75" should read --FNo=1:1.25-1.75--.

Column 14:

Line 39, "formign" should read --forming--.

Column 15:

Line 25, "3.9-f4/fw<4.5" should read --3.9<f4/fw<4.5--.

Column 16:

Line 22, "4.5<((R5,1+R5,3)/NA-1))(1f51)<7.0" should read --4.5<((R5,1+R5,3)/(NA-1))(1/f51)<7.0--.

Line 27, "11<(υf,6+υ5,7)/2-υ5,5<15" should read --"11<(υ5,6+υ5,7)/2-υ5,5<15--.

UNITED STATES PATENT AND TRADEMARK OFFICE
CERTIFICATE OF CORRECTION

PATENT NO. :
DATED :       5,050,972
INVENTOR(S) :  September 24, 1991
                   HITOSHI MUKAIYA, ET AL.

It is certified that error appears in the above-identified patent and that said Letters Patent is hereby corrected as shown below:

Column 16:

Line 39, "means" should read --mean--.

Line 41, "Cliam 5," should read --Claim 5,--

Signed and Sealed this

Twentieth Day of April, 1993

*Attest:*

MICHAEL K. KIRK

*Attesting Officer*          Acting Commissioner of Patents and Trademarks